(12) United States Patent
Tsutsui et al.

(10) Patent No.: US 11,050,114 B2
(45) Date of Patent: Jun. 29, 2021

(54) IMPACT RESISTANT BATTERY ENCLOSURE SYSTEMS

(71) Applicant: Purdue Research Foundation, West Lafayette, IN (US)

(72) Inventors: Waterloo Tsutsui, West Lafayette, IN (US); Yuezhong Feng, Henan (CN); Weinong Wayne Chen, West Lafayette, IN (US); Thomas Heinrich Siegmund, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/543,599

(22) Filed: Aug. 18, 2019

(65) Prior Publication Data
US 2020/0251704 A1    Aug. 6, 2020

Related U.S. Application Data

(62) Division of application No. 15/797,191, filed on Oct. 30, 2017, now Pat. No. 10,388,926, which is a division of application No. 14/551,670, filed on Nov. 24, 2014, now Pat. No. 9,806,306.

(60) Provisional application No. 61/908,685, filed on Nov. 25, 2013, provisional application No. 61/908,682, filed on Nov. 25, 2013.

(51) Int. Cl.
| | |
|---|---|
| *H01M 50/24* | (2021.01) |
| *H01M 50/20* | (2021.01) |
| *A62C 3/07* | (2006.01) |
| *A62C 3/16* | (2006.01) |
| *A62C 99/00* | (2010.01) |

(52) U.S. Cl.
CPC ........... *H01M 50/24* (2021.01); *H01M 50/20* (2021.01); *A62C 3/07* (2013.01); *A62C 3/16* (2013.01); *A62C 99/0045* (2013.01); *H01M 2220/20* (2013.01)

(58) Field of Classification Search
CPC ............. H01M 2/1094; H01M 2/1077; H01M 2220/20; A62C 99/0045; A62C 3/07; A62C 3/16
USPC ..................................................... 429/97, 99
See application file for complete search history.

(56) References Cited

U.S. PATENT DOCUMENTS

| | | | |
|---|---|---|---|
| 2008/0220320 A1* | 9/2008 | Horikoshi | G06F 1/1632 429/82 |
| 2013/0177795 A1* | 7/2013 | Power | B60L 50/64 429/99 |

* cited by examiner

*Primary Examiner* — Gary D Harris
(74) *Attorney, Agent, or Firm* — Purdue Research Foundation

(57) ABSTRACT

Battery enclosure arrangements for a vehicular battery system. The arrangements, capable of impact resistance include plurality of battery cells and a plurality of kinetic energy absorbing elements. The arrangements further include a frame configured to encase the plurality of the kinetic energy absorbing elements and the battery cells. In some arrangements the frame and/or the kinetic energy absorbing elements can be made of topologically interlocked materials.

8 Claims, 28 Drawing Sheets

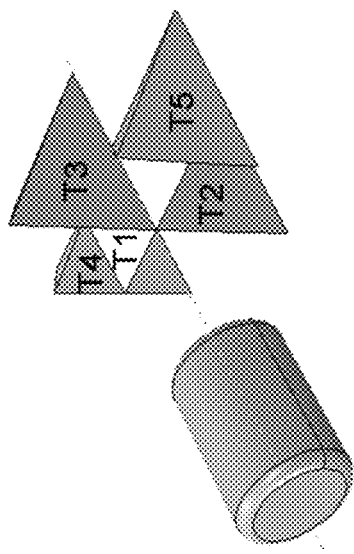
FIG. 9(C)
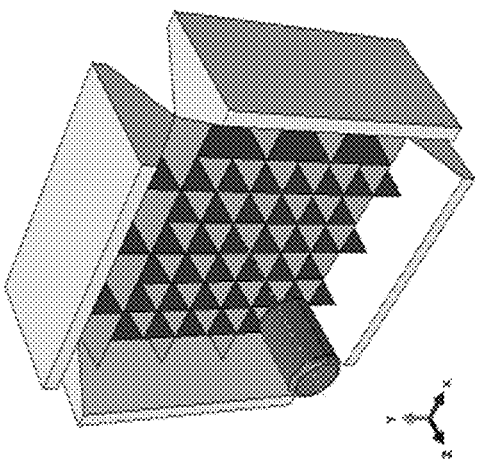
FIG. 9(E)
FIG. 9(B)
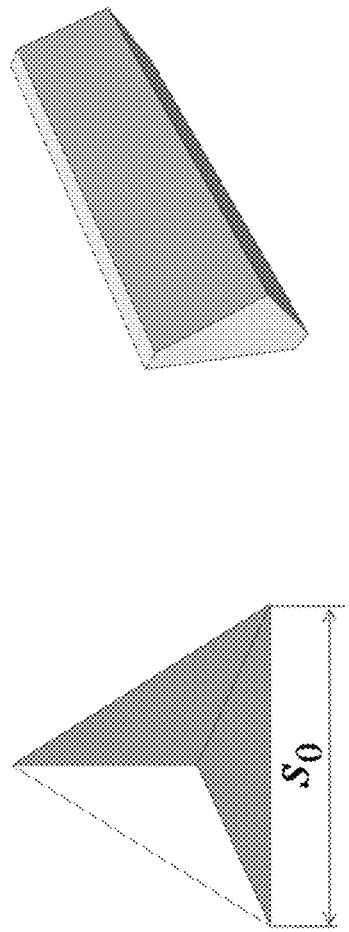
FIG. 9(A)
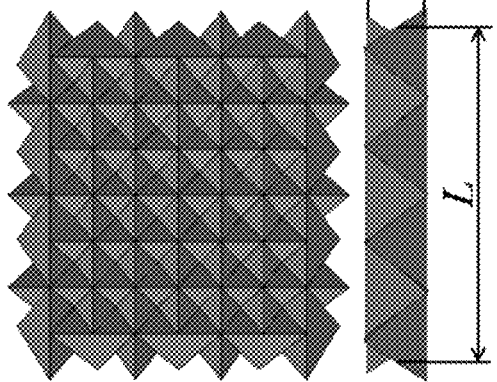
FIG. 9(D)

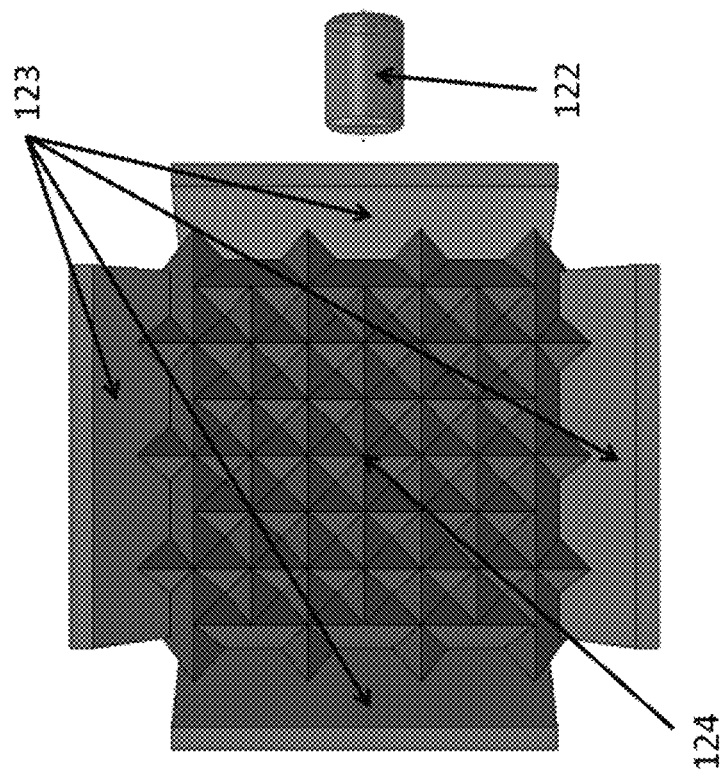
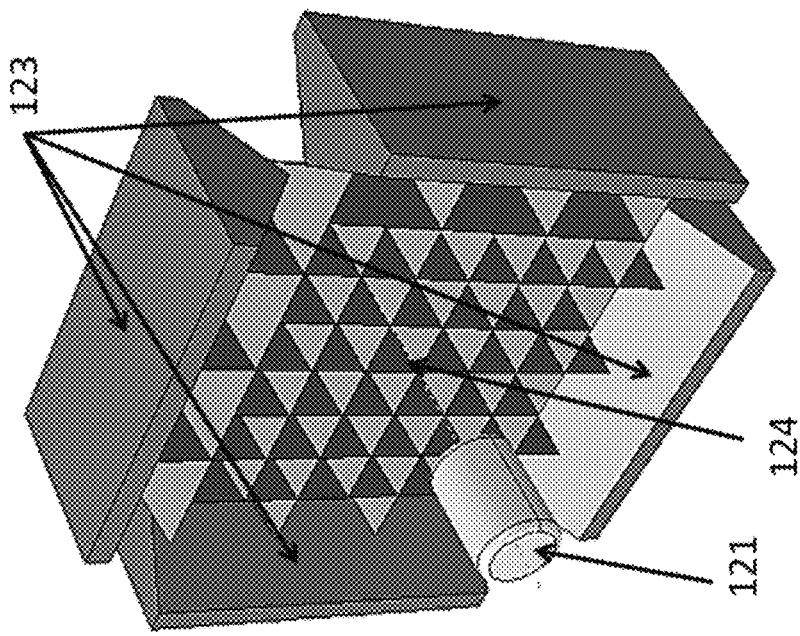
FIG. 12(A)
FIG. 12(B)

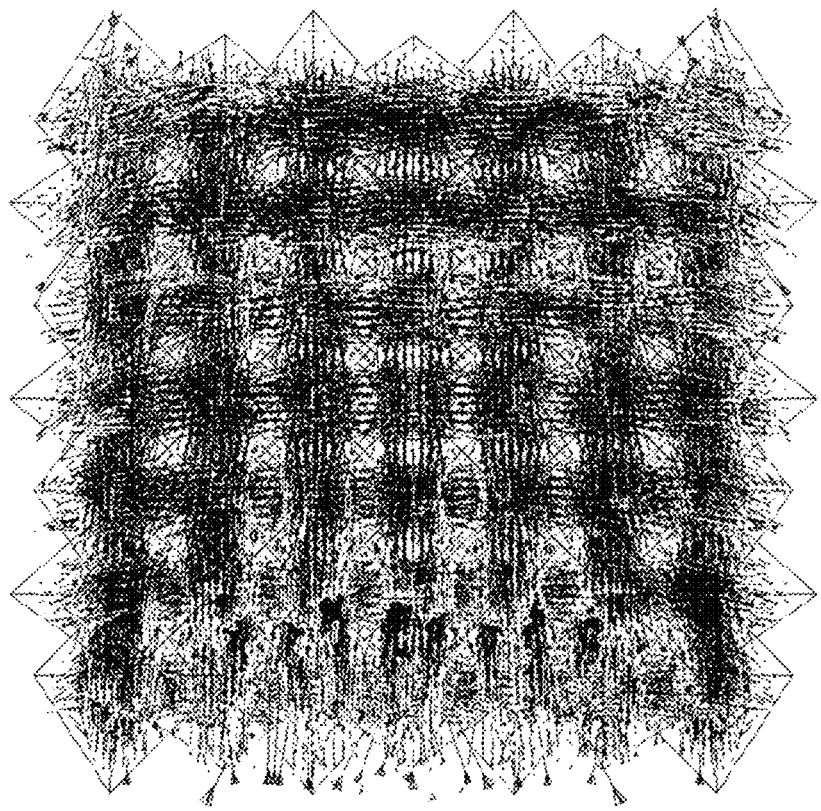
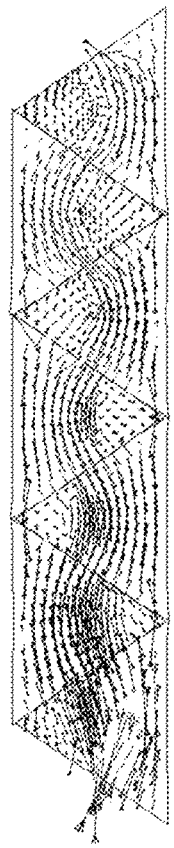
FIG. 14 (A)
FIG. 14 (B)

IMPACT RESISTANT BATTERY ENCLOSURE SYSTEMS

CROSS-REFERENCE TO RELATED APPLICATIONS

The present U.S. patent application is a divisional application of U.S. Pat. No. 10,388,926 issued Aug. 20, 2019, prior application Ser. No. 15/797,191 filed Oct. 30, 2017, which is a divisional application of U.S. Pat. No. 9,806,306 issued Oct. 31, 2017, prior application Ser. No. 14/551,670 filed Nov. 24, 2014, which claims the priority benefit of U.S. Provisional Patent Application Ser. No. 61/908,685 filed Nov. 25, 2013 and U.S. Provisional Patent Application Ser. No. 61/908,682 filed Nov. 25, 2013. The contents of these prior applications are hereby incorporated by reference in their entirety into the present disclosure.

STATEMENT REGARDING GOVERNMENT FUNDING

This invention was made with government support under DE-AR 0000378 awarded by the Department of Energy. The government has certain rights in the invention.

TECHNICAL FIELD

The present disclosure generally relates to impact absorbing arrangements and in particular to impact absorbing arrangement for batteries.

BACKGROUND

This section introduces aspects that may help facilitate a better understanding of the disclosure. Accordingly, these statements are to be read in this light and are not to be understood as admissions about what is or is not prior art.

In response to shortage of low cost fossil fuel, the automobile industry in the last decades has produced a large number of gasoline/electrical hybrid and fully electric vehicles. In either of these categories, a large battery pack is used to provide power to propel a vehicle. The range of a vehicle running on such a battery pack depends on the capacity of the battery. Vehicles with larger battery packs are becoming more prevalent. However, these battery packs present challenges.

One such challenge is crashworthiness. A battery pack typically includes a plurality of cells. Nowadays lithium-ion battery technology is the technology of choice, while just as recent as a few years ago nickel metal hydride was most prevalent. While lithium ion battery packs provide a larger energy density, lithium ion packs are known to be unstable when subject to large impact forces. As a result, much effort has been placed in developing enclosures that protect the cells in the event of a collision. Exemplary enclosures of the prior art can be found in U.S. Pub. Pat. App. 20120160088.

However, many of the enclosures that have been developed are bulky and add a considerable amount of weight to the vehicle, thereby negatively affecting the vehicle's range operating on the battery pack. Furthermore, while the enclosures may be effective to provide protection for the battery pack in one direction in the event of a collision, they may not be as effective in other directions. Furthermore, current designs aim at protecting the battery pack during a vehicular crash. While a heavy battery pack may be protected, the occupants inside the vehicle may be subjected to more severe acceleration during a crash as a result of the conventional battery pack design. It should be emphasized that the main focus of protection is of the occupant(s) inside the vehicle. With the improvements in safety of battery cells, a proper arrangement of the heavy battery pack will enhance the personnel safety while the multifunctional use of batteries will reduce the overall weight of the vehicle.

Therefore, new enclosure arrangements are needed that can protect a battery pack comprising of a plurality of cells in multiple directions in the event of a collision resulting in impact forces on the battery cells and which can improve safety of the vehicle passengers utilizing the battery pack.

SUMMARY

An enclosure arrangement system for a vehicular battery system is disclosed. The enclosure arrangement system includes at least one enclosure arrangement module. Each enclosure arrangement module includes a group of battery cells surrounded by a group of kinetic energy absorbing elements. Each of the kinetic energy absorbing elements is in contact with at least one of the battery cells. The enclosure further contains a frame configured to encase the group of kinetic energy absorbing elements and the group of battery cells.

A high-shear battery enclosure arrangement system for a vehicular battery system is also disclosed. The high-shear battery enclosure system includes at least one high-shear enclosure arrangement module. Each high-shear enclosure arrangement module contains a high-shear shell which encases a rigid protective shell. The rigid protective shell contains a group of electrically insulated cases, wherein each insulated case includes a battery cell.

A topologically interlocked battery enclosure system for a vehicular battery system is disclosed. The topologically interlocked battery enclosure system contains at least one topologically interlocked battery enclosure module. The topologically interlocked battery enclosure module contains a group of battery cells and a group of kinetic energy absorbing elements. Each of the kinetic energy absorbing elements is in contact with at least one of the battery cells. The system further contains a frame made of a topologically interlocked material configured to encase the group of the kinetic energy absorbing elements and the battery cells.

BRIEF DESCRIPTION OF DRAWINGS

While some of the figures shown herein may have been generated from scaled drawings or from photographs that are scalable, it is understood that such relative scaling within a figure are by way of example, and are not to be construed as limiting.

FIGS. 9(a)-9(e) is a depiction of elements of the model system under consideration for TIMs.

FIGS. 12(A) and 12(B) are a depiction of two types of impact.

FIGS. 14(A) and 14(B) are deflection patterns (top view and cross sectional views, respectively) as a result of an in-plane loading.

DETAILED DESCRIPTION

Figure 1:
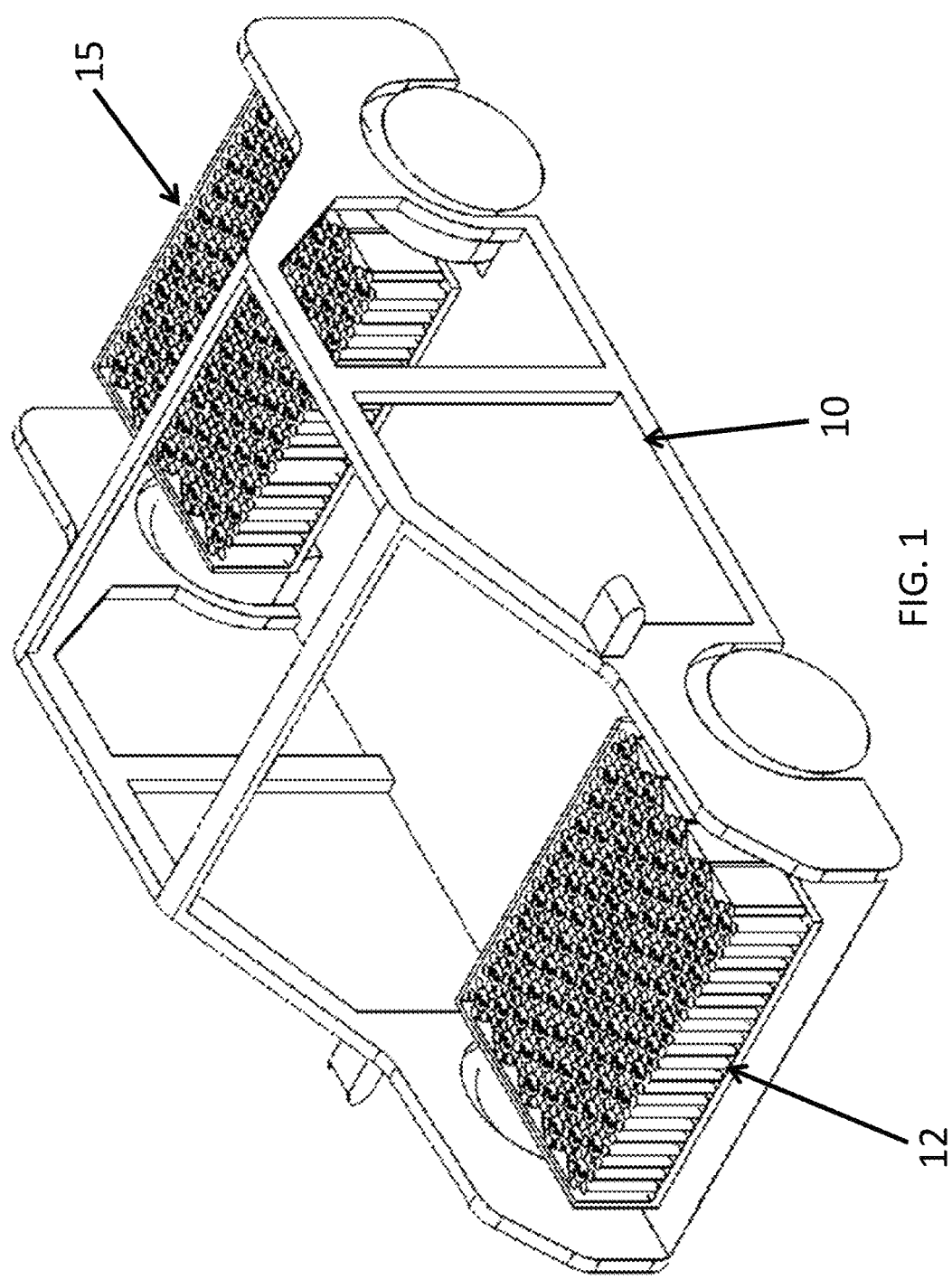
FIG. 1 is a schematic representation of a vehicle with battery enclosure arrangement modules according to the present disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

In the present disclosure, various embodiments of enclosure arrangements that can protect a battery pack with impact forces in multiple directions in the event of a vehicle collision and can improve the safety of vehicle occupants utilizing the enclosure arrangement.

In one type of enclosure arrangement, hereinafter referred to as Granular Battery Assembly or GBA, the enclosure arrangement includes deformation units around battery cell, wherein the deformation units absorb the kinetic energy of an impact providing protection for the battery cells. The kinetic energy may be absorbed by plastic deformation of deformation units. In this disclosure, deformation energy is defined as the amount of energy needed to deform deformation units. The protection of the battery cells also results in a reduced acceleration of the vehicle in the case of an impact, thus offering a level of protection for the vehicle occupants.

Referring to FIG. 1, a schematic of a vehicle 10 with two battery enclosure arrangement modules 12 and 15 is depicted at two different locations in the vehicle wherein the enclosure arrangement modules 12 and 15 are made according to one embodiment of the present disclosure. These battery enclosure arrangement modules are also termed arrangement modules or enclosure modules in this description. Battery enclosure modules 12 and 15 are based on GBA as described above. The term GBA will be used in this description to mean battery enclosure modules such as 12 and 15, as well as to mean any arrangement comprising battery cells surrounded by deformation units as shown in FIG. 3, as an example. While only one battery enclosure arrangement module is shown at each location (front and rear of the vehicle in the example shown in FIG. 1), it should be appreciated that a battery enclosure arrangement system can be placed at each location and such a system can contain one or more of the battery enclosure arrangement modules such as 12 or 15. It should be further noted that the locations for these modules shown in FIG. 1 are for example purposes only and other locations are possible. For example, the enclosure modules and/or systems can be distributed in the vehicle based on weight, impact and vehicle dynamics and other critical factors as appropriate. The enclosure arrangement modules and/or systems can be configured in various shapes (although rectangular shapes are depicted in FIG. 1). Various embodiments of the enclosure arrangements are discussed in the present disclosure. One embodiment is depicted in FIG. 2.

Figure 2:
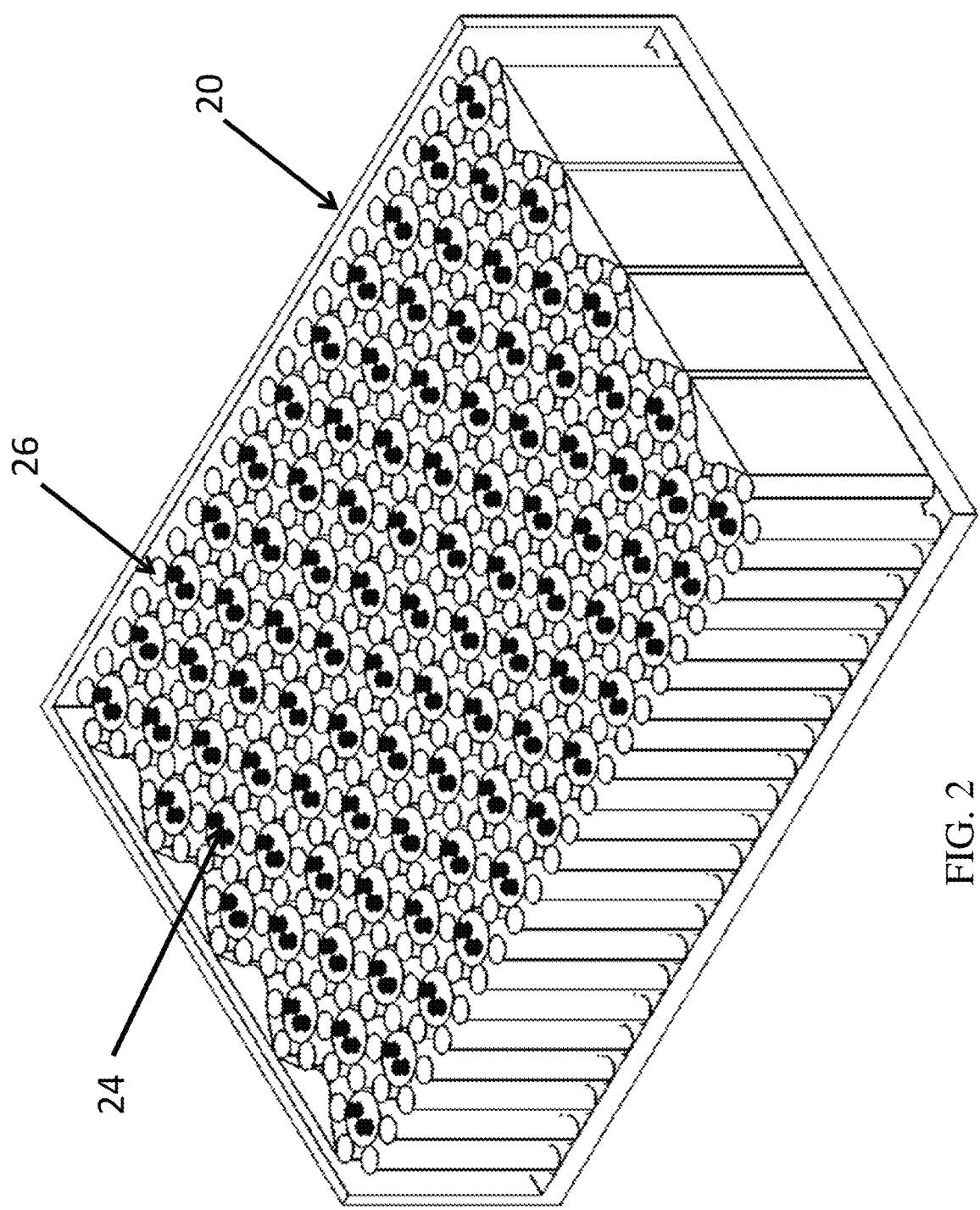
FIG. 2 is a representation one embodiment of the Granular Battery Assembly (GBA) in a vehicle.
Figure 3:
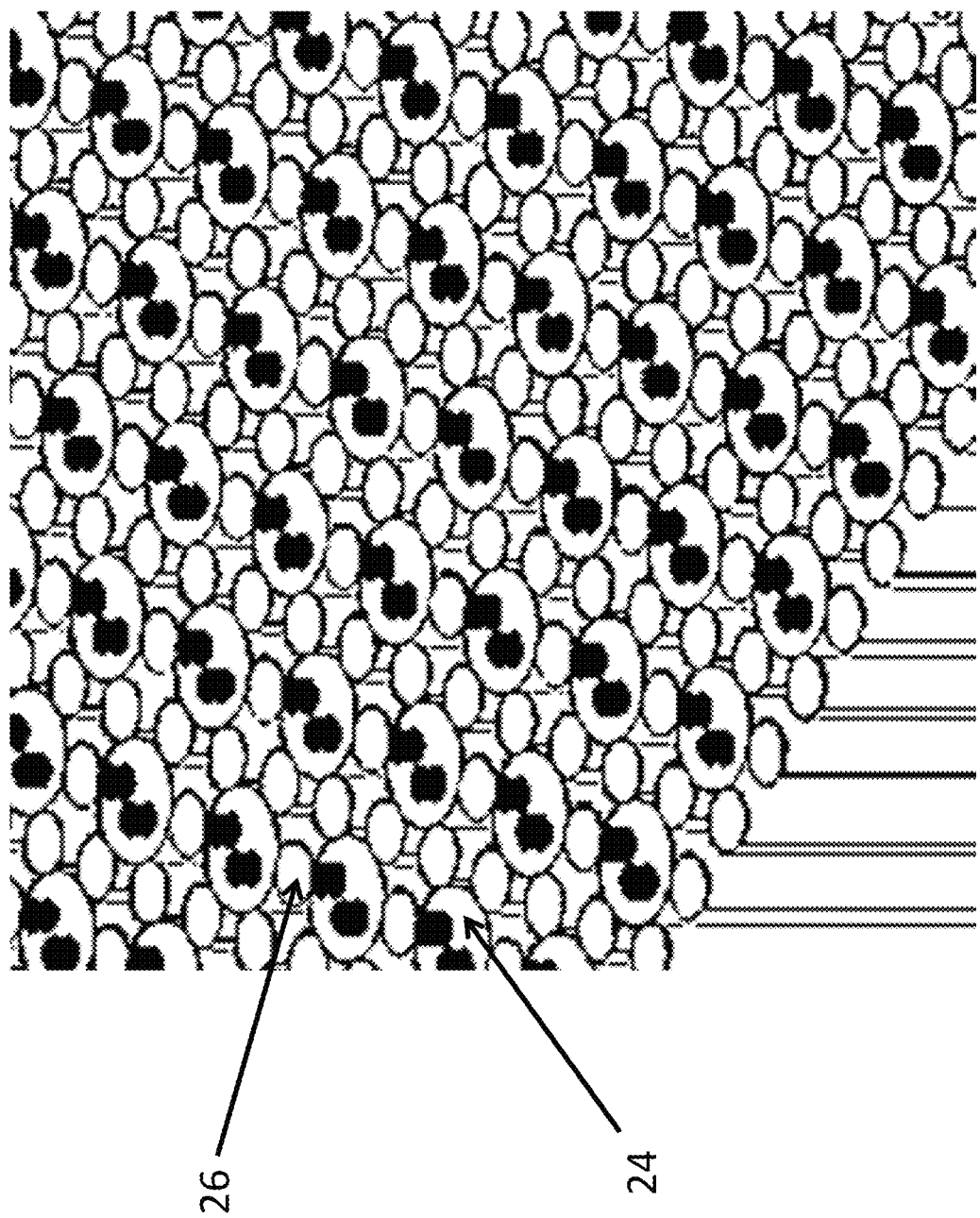
FIG. 3 is an expanded view of the battery cells and deformation units of an embodiment of GBA.

FIG. 2 is a representation one embodiment of the Granular Battery Assembly (GBA) in a vehicle. Referring to FIG. 2 a frame 20 surrounding a plurality of battery cells 24 and deformation units 26 (also referred to as kinetic energy absorbing elements) is depicted. The plurality of battery cells 24, the plurality of deformation units 26, and the frame 20 in FIG. 2 are together a representation one embodiment of the Granular Battery Assembly (GBA) in a vehicle. FIG. 3 is an expanded view of the cells 24 and deformation units 26 of an embodiment of GBA. The battery cells are depicted as larger cylindrical objects with terminals disposed on the surface of each cell as well as deformation units interdisposed (depicted as smaller diameter objects) between and around the battery cells. The battery cells are also termed as just "cells" in this description. Each cell is surrounded by six deformation units; however, larger or smaller numbers of deformation units are also possible. For example, the number of deformation units can be as low as one unit between two adjacent cells. While there may be practical limits on the number of deformation units between the cells, the limit can be larger. Furthermore, while a uniform pattern of cells/deformation units is depicted in FIGS. 2 and 3, no such limitation exists. It should be appreciated that the pattern of cells/deformation units can be variable. For example, there may be a larger number of deformation units inter-disposed between the cells closer to the perimeter of the enclosure arrangement module or enclosure arrangement system and lower number of deformation unit towards the center of the enclosure module/system. In FIGS. 2 and 3, each of the deformation units 26 is in contact with one or more battery cells, but not in contact with another deformation unit.

The deformation units 26 in FIGS. 2 and 3 are capable of being deformed and hence absorb kinetic energy. These entities can be made of several metallic and/or non-metallic materials. In one preferred embodiment, the deformations units can be made of aluminum metal or alloys of aluminum and are hollow cylinders. Other metallic and non-metallic materials can be used as solid cylinders or hollow cylinders. It should be appreciated that cellular material such as foam can be used and the geometry of the deformation units is not restricted to a cylinder.

An example of a deformation unit 26 is a hollow cylinder made of aluminum with an outer diameter of approximately 6.0 mm and an inner diameter of 5.0 mm, giving rise to a wall thickness of approximately 0.5 mm. An example of battery cell dimensions that can be used with deformation units with the deformation unit dimensions above is 18 mm in diameter and 65 mm in length, typically termed in industry as an 18650 battery. The thickness of the hollow cylinder is optimized based on deformation characteristics of the material in response to an impact force. Excessive wall thickness makes the cylinder not deform easily and hence will not give adequate protection for the batteries. Insufficient wall thickness will deform the cylinder too easily and will not effectively reduce the impact forces on the batteries. Other materials such as stainless steel can be used to make the deformation unit 26. With each material, the cylinder wall thickness has to be adjusted in accordance with the desired deformation characteristics.

The deformation units 26 are configured to move with respect to one another and with respect to the battery cells 24 such that when an object impacts the vehicle and delivers an impact force, the kinetic energy is absorbed by the deformation units which undergo deformation.

Shown in FIG. 2 is frame 20, encasing the cells and the deformation units. The frame is configured to hold these structures in place and to provide a containing envelope for battery cells and other parts during and after impact. In FIG. 2, it should be recognized that the frame 20 has four vertical walls and top and bottom surfaces. Only some of the surfaces are shown for clarity. In some cases, the top surface may not be needed if busbars are used which can mechanically constrain battery cells in their locations. The frame 20 frame can be built in a variety of ways to accommodate the battery cells 24 and deformation units 26.

Figure 4:
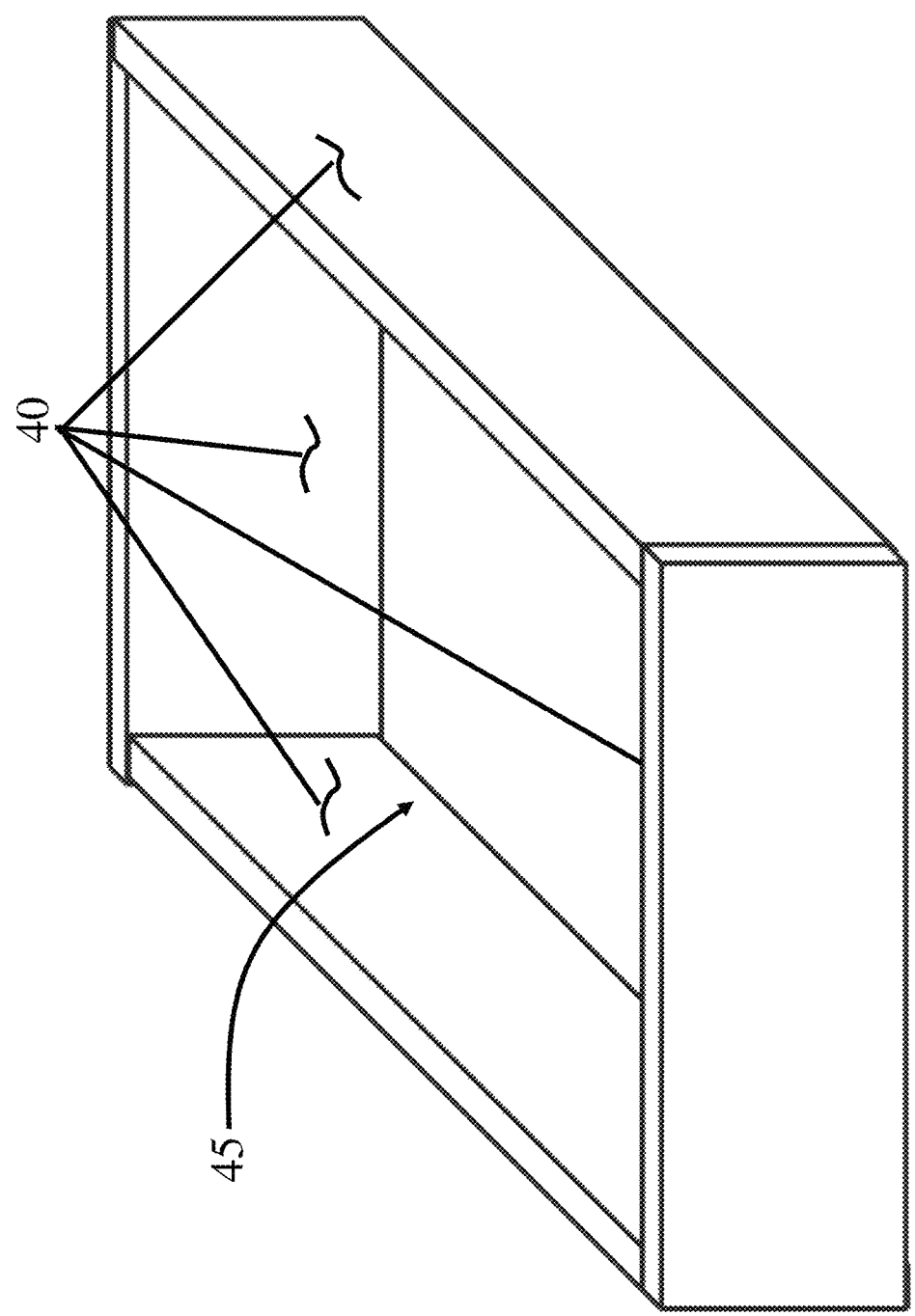
FIG. 4 is an embodiment of GBA according to the present disclosure.

With reference to FIG. 4, an embodiment of an enclosure arrangement utilizing GBA according to the present disclosure is depicted. In this embodiment, the perimeter formed by four of the vertical walls 40 defines a spatial zone 45. The spatial zone 45 can house multiple enclosure arrangement modules (that is, a battery enclosure arrangement system). Alternatively, the spatial zone 45 may comprise a combination of cell and deformation units. The advantage of such an arrangement is that a damaged enclosure modules or damaged cell/deformation combinations can be serviced or replaced.

Figure 5:
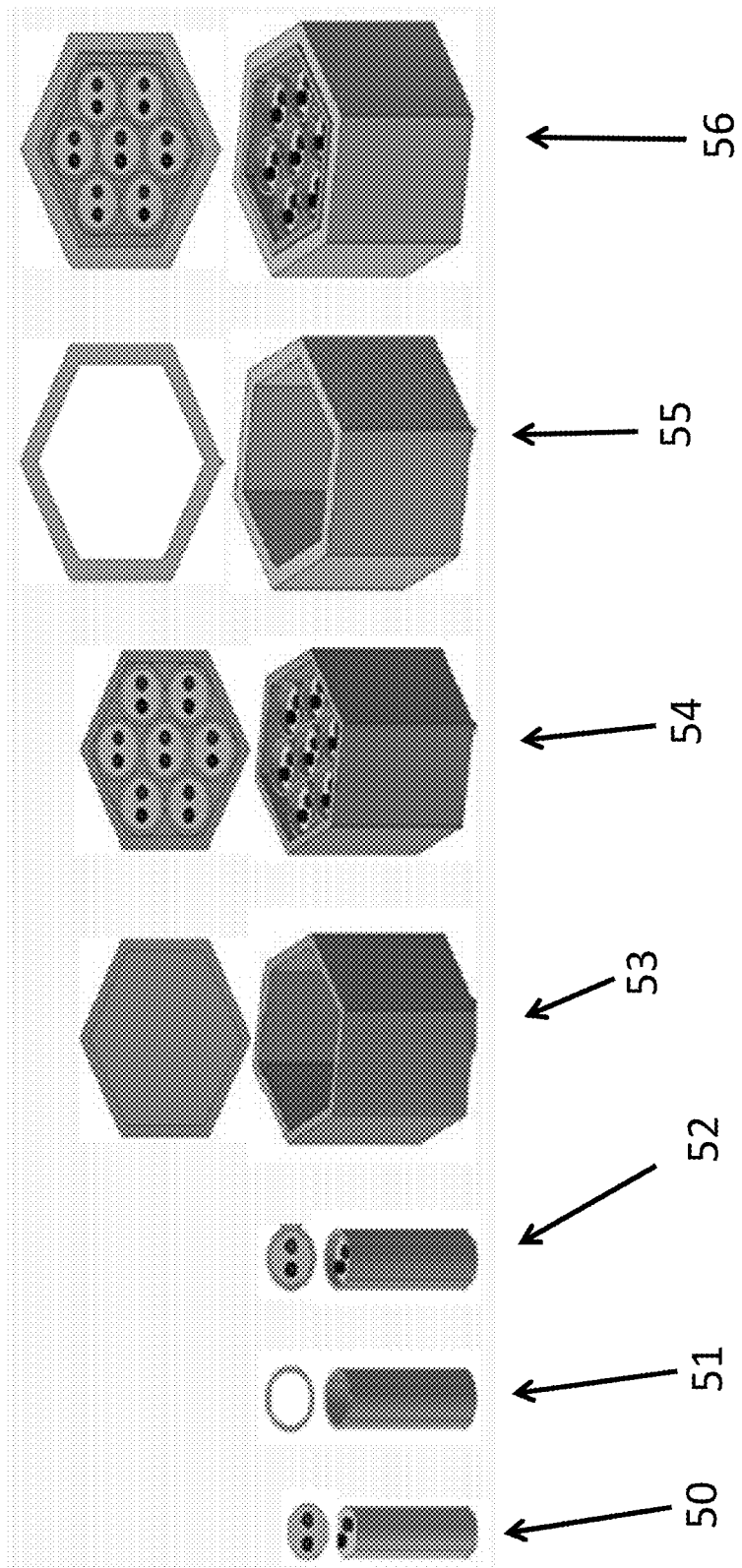
FIG. 5 is a depiction of various elements of a high-shear battery enclosure module.
Figure 6:
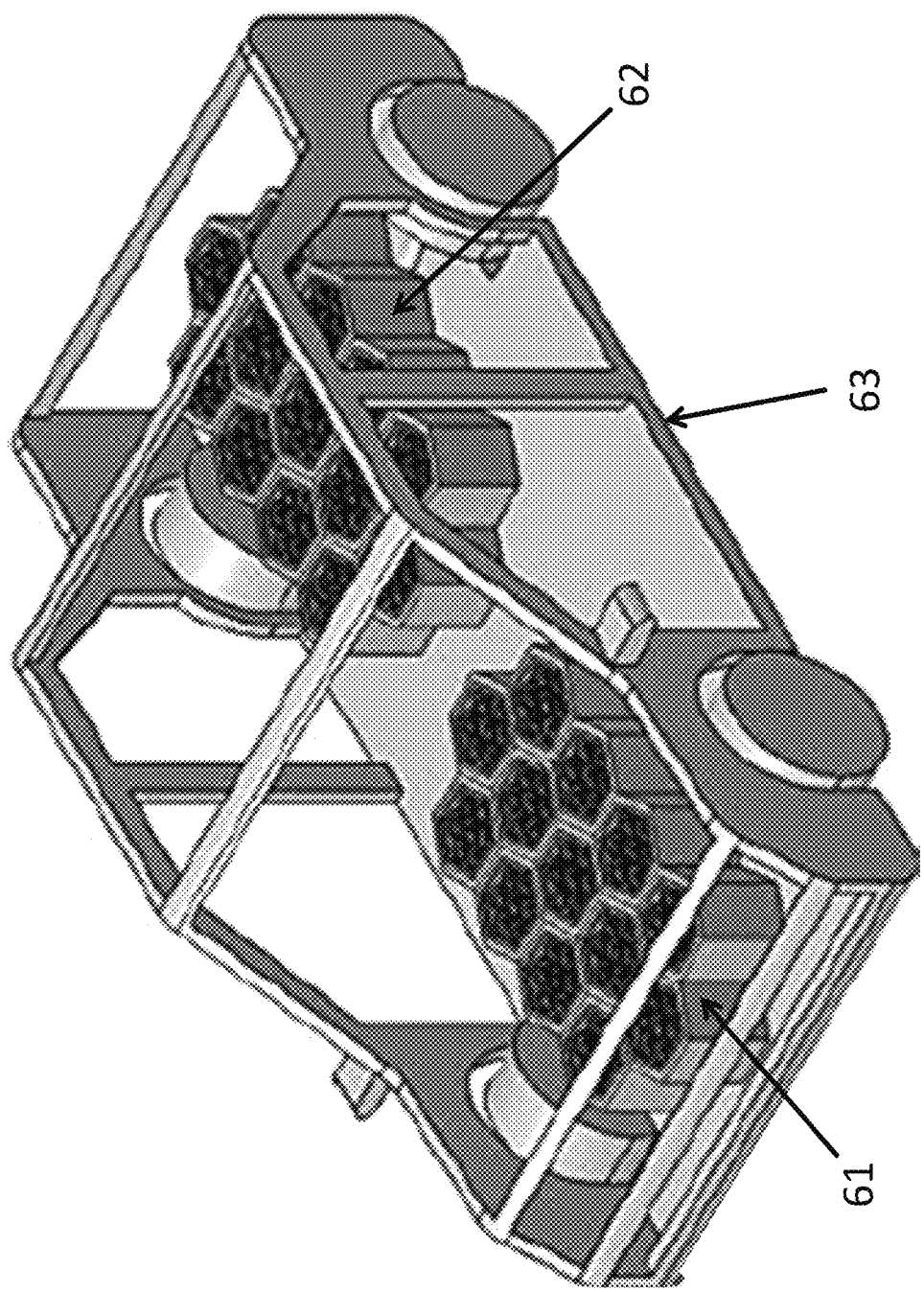
FIG. 6 is a depiction of a plurality of high-shear battery enclosure modules positioned next to each other.

FIG. 5 is a depiction of various elements of a high-shear battery enclosure module. In FIG. 5, perspective and top view schematics of various aspects of the arrangement are depicted. Each numeral in FIG. 5 represents perspective and top views of the element being described. The enclosure arrangement includes a plurality of cells disposed in the enclosure. Each cell 50 may be (optional) placed in an electrically insulated casing 51, giving rise to cell-in-casing 52. Here the word "insulated" is used to describe the property of electrical insulation. An example of a material used to make the electrically insulated casing 51 is Polyvinyl Chloride, generally termed PVC, which is wrapped around each cell. Other materials for this purpose include polyimide, which provides electrically isolating properties at elevated temperatures. The plurality of cells-in-casing 52 are then disposed in a protective shell 53 giving rise to cells with casings-in-a-protective-shell 54 which is then encased with a high shear shell 55 made of a high-shear material configured to dissipate kinetic energy, forming a high-shear battery enclosure module 56. A plurality of high-shear battery enclosure modules 56 can be positioned next to each other in order to generate high-shear battery enclosure systems 61 and 62 placed in a vehicle 63 as depicted in FIG. 6. The protective shell 53 can be made of, as an example, aluminum. Other materials, such as injection-molded plastics are also candidates for making this protective case 53. Yet, many other materials can be chosen to serve as the material for protective case 53. High-shear shell 55 can be made of polymers such as acrylic compounds. One non-limiting example is VeroWhitePlus available from Stratasys Ltd, Eden Prairie, Minn., USA. Another material that can be used for making high-shear shell is Topologically Interlocked Materials (TIMs) system to be described later in this disclosure.

The cell modules 56 are configured to be in tight contact with one another to allow effective conversion of kinetic energy into other form of energy with the frictional energy being the most significant. In addition, the cell modules 56 are configured to spread impact forces amongst the cell modules such that a large impact force is divided into smaller magnitude forces acting on each module.

Figure 7:
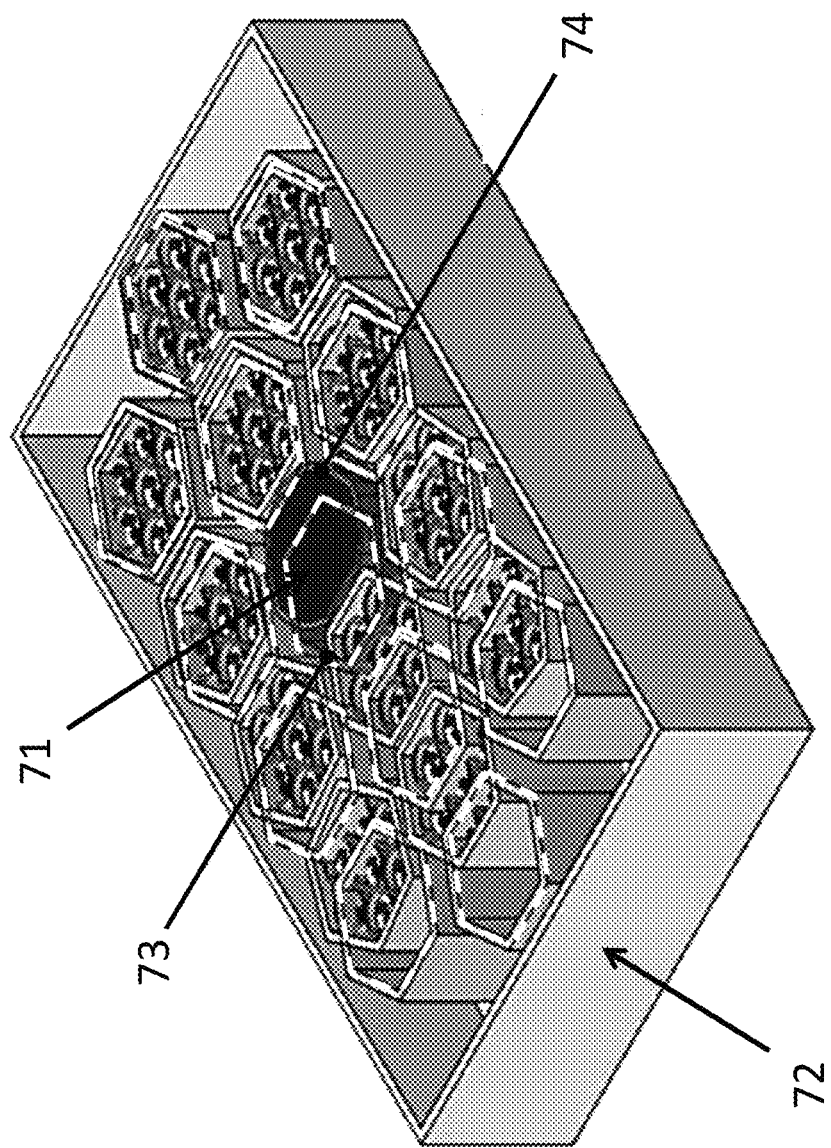
FIG. 7 is a depiction of the movement of the high-shear modules and rupture modules.

According to another embodiment of the present disclosure, the high-shear battery enclosure system depicted in FIG. 6 may also include one or more rupture modules, as depicted in FIG. 7. FIG. 7 is a depiction of the movement of the high-shear modules and rupture modules. In FIG. 7, a rupture module 71 is a specialty module with the same outer shape and dimensions as the high-shear shell of the high-shear enclosure arrangement module. The rupture module 71 can be placed at various locations within the high-shear battery enclosure system and is made of material that can rupture in response to a pre-determined minimum impact force. That is, a minimum impact force must exist before the rupture module ruptures. As an example, the rupture material can be made of same material as the high-shear shell 55. The rupture module 71 ruptures before the high-shear shell 55 can rupture since the high-shear shell 55 is in contact with the rigid shell 53.

In FIG. 7, movement (i.e., representative of shear strain) of the high-shear enclosure arrangement modules and a rupture module 71, together called as modules in this paragraph, are also depicted. Each module is shown with casings-in-a-protective-shell 54, rather than a high-shear battery enclosure module 56 for better visibility of the enclosure movement. It is appreciated that modules closer to impact force 72 will experience higher shear strain and modules farther from the impact force will have smaller shear strain. In FIG. 7, the positions 73 of the modules prior to the application of the impact force are depicted in dashed lines and the positions 74 of the modules after the application of the impact force are depicted in solid lines. The displacement of modules closest to the impact point is the largest and the distance is shortest farthest away from the impact point. It should also be appreciated that the modules are in contact with each other in high-shear battery enclosure modules 56, whereas modules are shown separated in FIG. 7 since FIG. 7 visualizes the modules with casings-in-a-protective-shell 54.

Figure 8B:
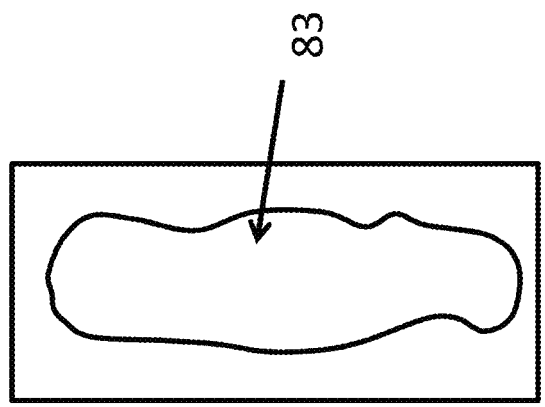
FIGS. 8(A)-8(B) are schematics of an embodiment of the rupture module.
Figure 8A:
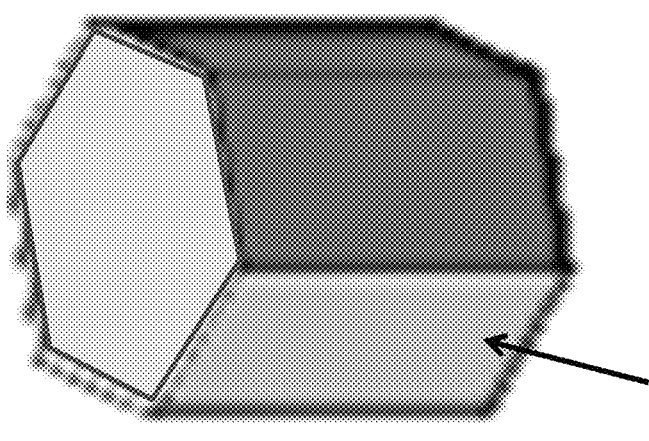

Schematics of an embodiment of a rupture module are depicted in FIGS. 8(A)-8(B). As depicted in FIG. 8(A), the rupture module 81 may have shell structure made of a high-shear material. Alternatively, the rupture module may be constructed from a polymer structure which in the operating temperature range of batteries, the high-shear battery enclosure module can maintain the form depicted in FIG. 8(A). The rupture module may contain a fluid as indicated in FIG. 8(B). The fluid shown in 8(B), as an example, can be a fire extinguishing fluid 83 or a coolant. In the case of using a fire-extinguishing fluid or a coolant fluid, the rupture module may be configured to rupture at a pre-determined impact force and expel the fluid. While one rupture module is depicted in FIG. 7, these rupture modules can be strategically positioned about the high-shear battery enclosure arrangement system to provide the desired fluid released onto the remainder of the system. It should be noted that fire-extinguishing fluid or coolant, positioned elsewhere may also be released by the triggering of airbags through an electronically controlled releasing system. It should be further noted that the rupture modules containing a fluid can be pre-pressurized and electronically triggered to rupture in case of a crash or air-bag deployment in a vehicle. Crash or air-bag deployment can be sensed electronically and the sensors can initiate a rupture of the pre-pressurized and fluid-containing rupture module. Examples of a suitable fire extinguishing fluid 83 include fluids containing sodium chloride (NaCl) dry powder or fluids containing copper (Cu) dry powder. Both of these powders are used in Class "D" fire extinguishers.

Another type of battery enclosures to enhance impact resistance and mitigate the effect of impact forces on vehicle occupants will now be disclosed in this disclosure. These are based on the concept of topologically interlocking materials (TIMs). Topologically interlocked materials are a class of materials in which individual unit elements interact with each other through contact only. Cracks and other defects occurring due to external loading are contained in the individual unit elements. Thus, topologically interlocked materials are damage tolerant and provide high structural integrity. TIMs can be considered as interesting mechanical meta-materials as these derive their unique properties not from composition but from structure. Forces and energy can only be transmitted through the contact surfaces; accordingly, there are no tensile forces developed when TIMs carry loads. These unique characteristics of TIMs provide unique properties that can be utilized to produce adaptive and configurable structures to harsh conditions such as random and harmonic vibrations, thermal loads, repetitive shocks, and acoustic attenuation. In this disclosure, battery enclosures utilizing TIMs will be termed Topologically Interlocked Battery Assemblies or TIBA. Thus in this disclosure, the term TIBA can be used whenever TIMs are used as part of battery assembly.

The present disclosure describes a novel arrangement directed to a response mechanism of topological interlocked materials (TIMs) due to impact loading. The disclosure also describes the benefits of TIMs in energy absorption, as well as the mechanical and structural applications of TIMs. In particular, a novel TIMs assembly arrangement for battery enclosures (topological interlocked battery assembly, "TIBA") is disclosed. TIMs include dense packing of tetrahedral unit elements made of polymers, such as Acrylonitrile Butadiene Styrene (ABS) and Acrylic. The tetrahedral unit elements are fabricated using fused deposition modeling (FDM) additive manufacturing (AM) as described in literature. Limited exploratory research has been done in understanding the mechanical characteristics of these TIMs, more specifically TIMs subject to low velocity impact. According to the present disclosure, the impact velocities considered (in the case of impact in a battery enclosure situation) are much lower than the dilatational wave speed of the material in the unit elements ($V_{imp} < c_d/10$), where $V_{imp}$ is impact velocity and $c_d$ is dilatational wave speed. A finite element methodology was employed to conduct numerical experiments. First, the model was calibrated on experimental data of low and constant velocity loading. Then, the response under constant applied velocity was considered, and the contributions of inertia, elastic resistance, and contact and friction to the mechanical resistance were explored. Subsequently, impact loading was considered and the formulations in literature were employed to characterize the velocity response. These models were reformulated to provide specific insight into the impact response of the TIMs assemblies. A comparison to monolithic structures under impact was made.

FIGS. 9(a)-9(e) show the model system under consideration with (a) a regular tetrahedron as the basic unit of the TIMs assembly, (b) a boundary element (termed abutment), (c) the indenter/projectile and the center five tetrahedra onto which the indenter transferred the load, (d) the TIMs tile composed with identical regular tetrahedra, (e) the overall TIMs assembly together with the cylinder shaped indenter/projectile shown in a transverse direction. In FIG. 9(e), 91 represents the fixture or abutments for the TIMs being investigated. In the model assembly, total of N×N=49 (where N is the number of tetrahedra in one row/column of topologically interlocked material assembly) substantially identical tetrahedra were assembled in a square lattice pattern into a monolayer TIMs assembly, which was confined with abutments along the edges of the assembly. The edge length of an individual regular tetrahedron was so, where so is edge length of regular tetrahedron. The other dimensions of the TIMs assembly could be derived as the thickness of the monolayer $t=s_0/\sqrt{2}$, the dimension of the mid-plane of the TIMs assembly, $L=s_0 \times (N/2)$. Here, the TIMs assembly was characterized by N=7 and $s_0$=25 mm, such that t=17.7 mm and L=87.5 mm.

In the analysis, two loading conditions were considered: (1) constant velocity loading by an indenter and (2) impact loading by a projectile. In both cases, the load was applied to the center of the TIMs assembly such that the indenter/projectile interacts directly with tetrahedra #1, #2, and #3 of the assembly. The diameter D of the indenter/projectile is D=L/5.

Tetrahedra were considered to be isotropic and elastic. Motivated by prior experiments on TIMs assemblies, the material properties of ABS were employed (Young's modulus E=1.827 GPa, Poisson's ratio v=0.35, density $\rho_0$=950 kg/m$^3$). As a result, one tetrahedron possesses a mass of $m_0=1.75 \times 10^{-3}$ kg and the overall assembly weighed 8.58× 10$^{-2}$ kg. The abutments as well as the indenter/projectile were considered as rigid bodies. The density of the projectile was $\hat{\rho}$=1470 kg/m$^3$. A Coulomb friction model was employed which introduces the coefficient of friction μ. For the normal contact behavior, it was assumed that contact pressure $p_c$ was linearly dependent on the overclosure $\Delta_n$ asp$_c$=$K_c \Delta_n$, where $K_c=(K^* E^*)/(\pi s_0)$ was the contact stiffness with K* a normalized contact stiffness, and $E^*=E/[2(1-v^2)]$. This type of interactions was adopted to describe the contact behaviors for the inter-tetrahedra, tetrahedron-abutment, and tetrahedra-indenter contacts. Experimental data on the low velocity impact response of TIMs assemblies from literature was used to calibrate the model parameters µ and K*.

Fragmentation commonly occurs for brittle materials subject to impact loading. To compare the impact resistance of TIMs made by brittle materials with and without fragmenting, a cohesive zone model (CZM) was further developed. Motivated by the TIMs used in experiments in which the tetrahedra were made with additive manufacturing, the zero thickness cohesive zone (CZ) layers were created parallel to the mid-plane of TIMs assembly, i.e., perpendicular to the impact direction, which was meshed with cohesive element COH3D8. In each tetrahedron, equally spaced eight CZ layers were inserted. Therefore, each tetrahedron contained 10 solid layers and 8 CZ layers. A bilinear traction-separation law was used to describe the constitutive response of CZM, with maximum strength $\sigma_{max}=E/100$, failure separation $\delta_f=s_0/1000$ and damage initiation separation $\delta_0=\delta_f/10$. Since ABAQUS/Explicit method was used to solve the dynamic problem, the density of the CZ layer needed to be defined. In the simulations for TIMs with CZ layers, the density of the CZ layer was $\rho_{coh}=1.0$ kg/m$^3$ which did not increase the inertia of the structure significantly, as well as the computational difficulty. Aside from the CZ properties, all the other properties and conditions were the same as the ones used in the impacting simulations of TIMs with isotropic tetrahedra.

In the constant velocity cases, a predetermined displacement was applied on the indenter and the time interval of loading was varied in order to achieve a constant velocity $V_0$. In the impact cases, a projectile of a defined mass M with initial velocities $V_{imp}$ struck the TIMs assembly. The mass of the projectile was chosen as 10% of the total mass of the 7×7 tetrahedra. The abutments were fixed in space in all cases.

Finite element models of the TIMs assembly were constructed in the general purpose finite element code ABAQUS (Version 6.12). The finite element mesh employed 3D linear solid element (C3D8R in the ABAQUS code) with each tetrahedron being comprised of 500 elements such that the overall model included 24,500 elements. The model was solved using the ABAQUS/Explicit solver, and the general contact algorithm implemented in the ABAQUS software was employed. In all the simulations, one analysis step was defined. The automatic time increment algorithm was employed and the global stable increment estimator was selected. The step time period for constant velocity loading varied dependent on loading velocities while an analysis interval of 5 ms was considered in all impact loading cases.

In prior experiments, a drop mass of $M_{drop}=6.21$ kg and drop height $H_{drop}=36.58$ mm were employed. Since the drop mass significantly exceeded that of the TIMs assembly, a near constant velocity loading condition ($V_0=0.925$ m/s) was achieved in the experiment. The data of the forces-deflection record was used to calibrate the parameters µ and K*.

The computational study provided the force-deflection relationships of TIMs for contact stiffness (K*=0.5) and different coefficients of friction. From computations considering a range of values of µ(0.1<µ<1.0), at a contact stiffness K*=0.5, force-deflection responses typical of TIMs assemblies was predicted. The force initially increased with the deflection. As soon as the force reached its peak value, gradual softening occurred until the resistance of the TIMs assembly vanished. The resistance of the TIMs assembly to the applied load was found to increase with an increase in coefficient of friction µ. The predicted peak force increased from 48.5 N to 513.0 N when µ was changed from µ=0.1 to 1.0. The results also indicated an increase of the deflection to final collapse of the TIMs with an increase in µ. For the lowest value of µ considered (µ=0.1), the load carrying capacity of the TIMs substantially vanishes at a deflection of 22.0 mm; however, this limiting deflection increased more than double for cases considering higher values of µ. The next set of computations considered a range of contact stiffness values (0.1<K*<1.0) and constant coefficient of friction µ=0.3. It was found that the magnitude of the predicted forces increased with increased contact stiffness. The peak force was found to increase from approximately 52.0 N to 513.0 N as K* was increased from K*=0.1 to 1.0. However, the deflection to loss of load carrying capacity did not vary significantly at about 35.0 mm for all cases.

The results of the parametric computations indicated that the coefficient of friction affected both the magnitude of the force and the deflection to final failure, while the contact stiffness played a role only in the force magnitude. Therefore, a calibration procedure was developed. First, the coefficient of friction was calibrated with respect to the experimental results of the deflection to final failure. Then, the contact stiffness was selected to provide a final force-deflection relationship consistent with experimental results. The calibrated parameters were µ=0.2 and K*=0.38. Model predictions of the force-deflection response obtained using the best-fit parameters for µ and K* together with the experimental data demonstrated a good quantitative agreement. A good qualitative agreement was also seen for residual deformations of the TIMs assemblies and the model simulation.

Simulations of TIMs subjected to constant velocity loading were conducted with applied velocities ranging from 0.1 m/s to 10 m/s. For the lowest velocity case, $V_0=0.1$ m/s, the force increased smoothly with the increase of deflection. The deflection reached its peak at 11.0 mm, then the deflection decreased gradually to zero. As the applied velocity increased, multiple peaks developed in the force-deflection relationship. When the loading speed was greater than 1 m/s but less than 5 m/s, the first peak increased with increasing velocity dramatically, while the second peak maintained its value. When the loading speed was greater than 5 m/s, both first and second peaks increased with increasing velocity.

Force-deflection relations for $V_0=0.1$ m/s with confinement, $V_0=4$ m/s with and without confinement were developed. A simulation for unconfined TIMs meant that the abutments, shown in FIG. 9(b), were taken away in the computation. In this case, the force increased quickly to its peak value then dropped immediately. There was no support force acting on the TIMs tile except a force due to the 'inertia' of the TIMs tile, where the presence of inertia force suggested the dynamic loading as opposed to the quasistatic loading. Since there was no such phenomenon occurred for the $V_0=0.1$ m/s case, the $V_0=0.1$ m/s case can be considered as a quasistatic loading case. Therefore, the force-deflection relationship for the $V_0=4$ m/s with confinement was considered as the sum of the other two cases: Quasistatic response and unconfined model response with same impact velocity.

The velocity of center tetrahedron was defined at the center of the center tetrahedron. The center tetrahedron was the tetrahedron that the indenter directly strikes on, T1 as shown in FIG. 9(c). Analysis of the velocities of center tetrahedra during the indentation was performed using the relatively low and high indention velocities of $V_0=4$ and 10 m/s, respectively. The result of analysis demonstrated that the velocities increased with time at the beginning of indention, then decreased and increased alternatively. Finally, the velocity converged to the constant velocity. Overshoots occurred during indention. For $V_0=10$ m/s, after the force reached its peak value, the velocity of center tetrahedron dropped far below the indentation speed because of the interaction with adjacent tetrahedra through contact. Then, the indenter accelerated again, which resulted in a second peak force in the force-deflection relationship. For $V_0=4$ m/s, there was also a situation where the center tetrahedron speed is lower than that of indentation speed. However, the speed difference is not significant, so the re-acceleration was not observed in the force-deflection relationships.

All series of computations with impact velocities ranging from 1 m/s to 80 m/s were performed with all simulations employing the calibrated model parameters. The ballistic limit for the TIMs assembly was determined as $V_{bl}=34$ m/s, such that at the end of this impact event the velocity of the projectile was zero. Below $V_{bl}$ the projectile rebounded. Then, above $V_{bl}$, the target was penetrated. An analysis of the force-displacement responses of the projectile for low and relatively high impact velocities showed that the forces increased at the beginning of impact, reached their peaks then decrease with displacement. Similar to the constant velocity loading cases, the reaction forces increased with increasing of loading speed. Then, the second peak was developed. While the impact loading results in lower reaction force for the same initial loading velocities, for higher impact cases, rebound and penetration were observed for different impact velocities. It was further demonstrated that that the TIMs absorbed higher amount of impact energy with higher impact velocity. The results of the forgoing analysis were used to predict the velocities of center tetrahedron and projectile for impact velocity $V_{imp}=4$ and 10 m/s, respectively. Comparison of the results with constant velocity loading showed that center tetrahedron obtained smaller velocity under impact loading when the initial loading speed for both cases were the same. After the center tetrahedron decelerated due to the interaction with surrounding tetrahedra, the velocity difference between projectile and center tetrahedron became smaller in the impact loading case. This observation explained the differences among force peaks described earlier in the analysis of the force-displacement relationships.

The velocity histories of the projectile and the center five tetrahedra, FIG. 9(C) were analyzed for four values of the impact velocity $V_{imp}$. In all cases $V_{imp} \geq V_{bl}$. At the ballistic limit, both velocities of the tetrahedra and the projectile reached zero. For impact velocity slightly higher than ballistic limit, $V_{imp}=45$ m/s, the velocities of the center tetrahedron and the projectile velocity were slightly larger than that of the surrounding tetrahedra. This indicated that the projectile strongly interacted not only with the center tetrahedron but also with the surrounding tetrahedra due to the topological interlocking. For relatively high impact velocity cases, this situation changed. For $V_{imp}=55$ and 80 m/s, the center tetrahedron gained much higher velocity than its neighbors. Still, for $V_{imp}=55$ m/s the projectile velocity was similar to that of the surrounding unit elements indicating that the TIMs continued to provide some level of resistance. Only at much higher impact velocity, $V_{imp}=80$ m/s, such interaction was lost and the projectile velocity increased beyond that of the surrounding tetrahedra. Analysis of the deformed configurations of the TIMs assemblies during impact confirmed these different levels of interaction between projectile and the TIMs target.

The central variable to characterize the resistances of plates and plate-like systems to impact is the residual velocity of the projectile after passing the target. When the impact velocity is greater than the ballistic limit velocity, the projectile penetrates the target and keeps moving forward with non-zero kinetic energy. For conventional metal plates or plate-like targets a formula from literature predicts the residual velocity as follows:

$$V_{res} = \begin{cases} 0, & V_{imp} \leq V_{bl} \\ a(V_{imp}^p - V_{bl}^p)^{1/p} & V_{imp} > V_{bl} \end{cases}$$

in which a an p are constants to be fitted with the residual velocity data, $V_{imp}$ is impact velocity and $V_{bl}$ is ballistic velocity. Using a model available in literature, Lambert-Jonas model, a nonlinear least square method was employed to obtain the fitting parameters a=0.343 and p=1.487. The coefficient of determination (R2) was calculated to be 0.9570, indicating the curve fits the numerical results well.

The fitted Lambert-Jonas model could provide an overall good description of the numerical results. Still, for higher impact velocities, the model fit was less accurate than for velocities close to the ballistic limit. A detailed examination of results led to the conclusion that the residual velocities solution could be separated into at least two regimes (below and above 56 m/s). Such differences in the response were traced back to the velocity history of projectile and tetrahedra and were due to the differences in interaction with the unit elements in the TIMs assembly. In summary, two limiting conditions were defined: (i) low velocity regime with strong persisting projectile-target interaction and (ii) a high velocity regime with weak projectile-target interaction. A transient regime existed at intermediate velocities. The transition regime was of particular interest as a local minimum in the residual velocity was present. In order to capture this response in the Lambert-Jonas formulism, a two-stage expanded Lambert-Jonas model was defined.

$$V_{res} = \begin{cases} 0, & V_{imp} < V_{bl} \\ a_1(V_{imp}^{p_1} - V_{bl}^{p_1})^{1/p_1}, & V_{bl} \leq V_{imp} \leq V_{trans} \\ a_2(V_{imp}^{p_2} - V_V^{p_2})^{1/p_2}, & V_{imp} > V_{bl} \end{cases}$$

In the above model, $V_{trans}$ is the transition velocity between the two limiting regimes, $V_V$ is a virtual ballistic velocity fitted on high impact velocity regime, and $a_1$, $a_2$, $p_1$ and $p_2$ are characterizing parameters. The residual velocity data were fitted to the two-stage model with fit parameters $a_1=0.308$, $a_2=0.425$, $p_1=1.772$, $p_2=1.528$, $V_V=46$ m/s, and $V_{trans}=56$ m/s, respectively. Based on the analysis, the coefficient of determination for low impact velocity was 0.9498 while for high impact velocity was 0.9883, which indicated a much better fitting with two-stage Lambert-Jonas model than the basic model for the high impact velocity regime.

To further explore the finding of the regime with a local minimum in residual velocity, computations were performed with a lower and higher value of μ, 0.15 and 0.25 respectively. The fit parameters for the projectile residual velocities vs. impact velocities are shown Table 1 below. In fitting the parameters, $p_1$ and $p_2$ were constrained to be greater than the one demonstrated in literature. Results discussed earlier show that the ballistic velocities and transition velocities increased with the increased μ. The charactering parameters $a_1$, $p_2$ and $V_V$ increased with μ while $a_2$ and $p_1$ decreased, monotonically. The two regimes in the residual velocities were independent of the friction condition. However, the importance of the transition regime with minimal velocity diminished or vanished as the coefficient of friction increased.

TABLE 1

Parameters of the two-stage Lambert-Jonas model

|  | $a_1$ | $a_2$ | $p_1$ | $p_2$ | $V_{bl}$[m/s] | $V_V$[m/s] | $V_{trans}$ [m/s] | $R^2$ |
|---|---|---|---|---|---|---|---|---|
| μ = 0.15 | 0.240 | 0.484 | 2.230 | 1.266 | 28 | 44 | 55 | 0.9083/0.9592 |
| μ = 0.20 | 0.308 | 0.425 | 1.772 | 1.528 | 34 | 46 | 56 | 0.9498/0.9883 |
| μ = 0.25 | 0.325 | 0.370 | 1.721 | 2.016 | 39 | 52 | 65 | 0.9914/0.9923 |

In addition, numerical analysis involved with four impact velocities ($V_{imp}$=34, 45, 55 and 80 m/s) were performed with the model enhanced by cohesive zone elements. Table 2 lists the terminal velocities for isotropic TIMs and CZ enhanced TIMs models. Using these results the projectile velocities for $V_{imp}$=55 m/s can be computed and compared. Then, a similar comparison was made for other impact velocity cases. Analysis of the fragmentation of CZ enhanced TIMs for different impact velocities showed that the CZ enhanced model resists impact better at lower projectile residual velocity. On the other hand, the difference was not significant when impact velocity was high. The result of the energy distributions showed that the CZ enhanced TIMs had higher kinetic energy at the end of impact event, which resulted from the fragmentation of the TIMs.

TABLE 2

Terminal velocities of TIMs with and without CZ enhancement [m/s]

|  | $V_{imp}$ = 34 m/s | $V_{imp}$ = 45 m/s | $V_{imp}$ = 55 m/s | $V_{imp}$ = 80 m/s |
|---|---|---|---|---|
| Isotropic TIMs | 0 | 8 | 10 | 23 |
| CZ enhanced TIMs | −2 | 2 | 8 | 18 |

The simulations of the TIMs response under constant loading speed provided insight into the relevance of the material parameters in the TIMs system. The responses were divided into three categories according to loading speeds as follows: Quasi-static response at low speeds, combination of quasi-static and dynamic response, and dominant dynamic. For quasistatic case, a quasi-ductile response was observed, which agreed with the experimental observation reported in literature. For moderate indentation speeds, the force-deflection response was considered as the combination of quasistatic response and unconfined TIMs under same indention speed. The transition speed is determined by the density of TIMs material and the normal contact behavior, while coefficient of friction does not affect the inertia responses significantly.

The dynamic characteristics of TIMs were further investigated with projectile impact loading conditions. The projectile residual velocity was used as the parameter to illustrate TIMs' resistibility to impact, with Lambert-Jonas models being employed to describe the numerical results. To have a more accurate description of the residual velocity results, an extended two-stage Lambert-Jonas model was developed. For conventional plate, the Lambert-Jonas formula was fitted with a=0.76 and p=2.36 based on experimental data in literature for ballistic penetration of steel plates. Another investigation in literature applied the model to a bi-layer metal system and obtained ranges of the parameters for different thicknesses of metal plates: 0.93<a<0.97 and 1.72<p<2.14. Other experimental and numerical results also indicated that for homogeneous plates and composite plates, a is close to 1.0 and p is close to 2.0. Comparing to the parameters in the Lambert-Jonas model for TIMs with conventional plates, the parameter p is close to that of conventional plates while a is significantly smaller. According to Lambert-Jonas formulism, a smaller a indicates lower residual velocity, therefore, more kinetic energy absorption.

Residual velocity comparison was performed between TIMs with isotropic tetrahedra or CZ enhanced tetrahedra. When the impact velocity was close to ballistic velocity of TIMs with isotropic tetrahedra, the residual velocities for TIMs with CZ layers were smaller. The increased stiffness of TIMs was due to the fragmentation. At the end of impact events, energy distribution of the entire system showed that the kinetic energy of the tetrahedra and fragments of TIMs with CZ layers was higher than TIMs with isotropic tetrahedra. These results were confirmed with the result of this study. For example, when the impact velocity was 34 m/s, every tetrahedron was almost motionless for TIMs without CZ layers at the end of impact. On the other hand, for TIMs with CZ layers, fragments fly with non-zero kinetic energy. Therefore, because of fragmentation, the implementation of CZ layers into TIMs actually increased TIMs' dynamic stiffness. The increment in dynamic stiffness is remarkable when impact velocities are close to ballistic velocity. For high impact velocities ($V_{imp}$=55 and 80 m/s), the differences of kinetic energies of tetrahedra/fragments for both models were not significant resulting in similar residual velocities as shown in Table. 2. It was also observed that damage was localized for TIMs. That is, only the tetrahedra directly impacted and their neighbors were damaged, while the tetrahedra away from the impact center kept their structural integrities.

Figure 10:
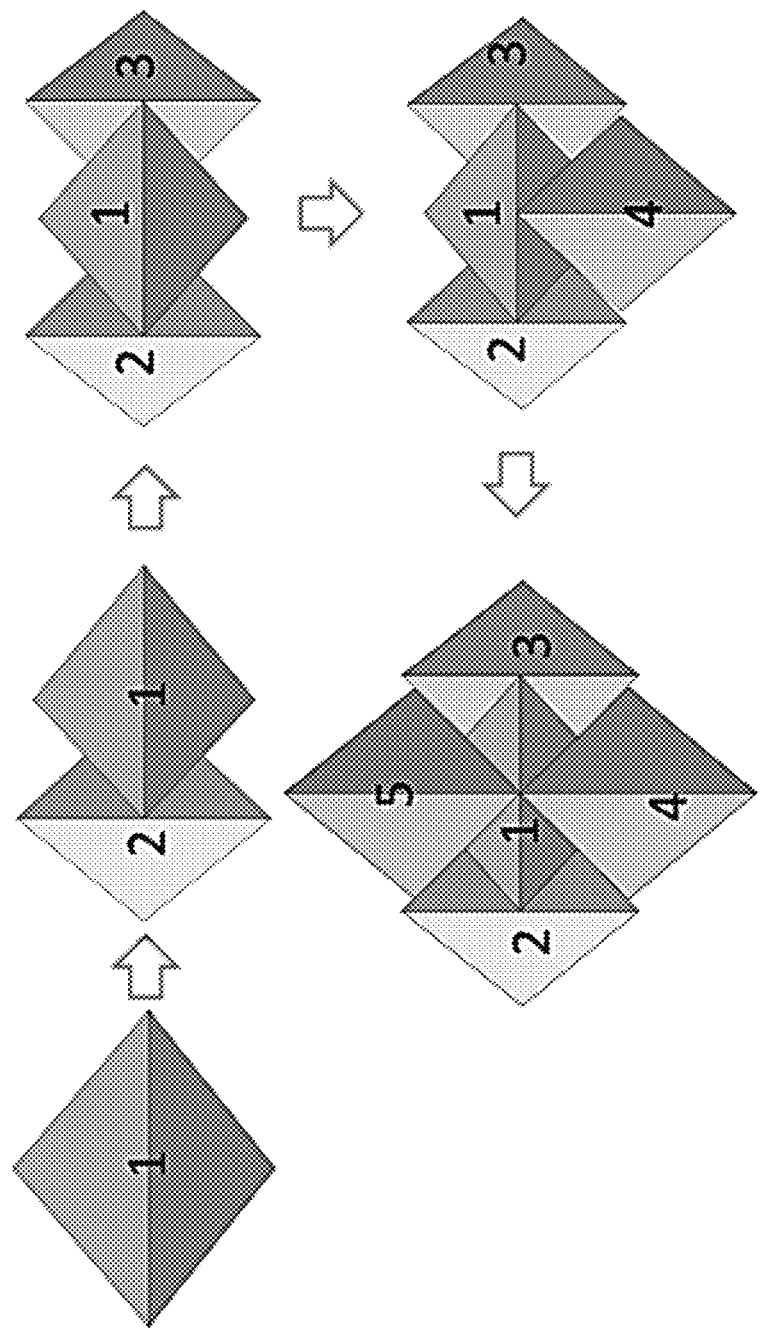
FIG. 10 is a depiction of assembly of the tetrahedral units, according to one embodiment of this disclosure.

FIG. 10 depicts method of assembly of the tetrahedral units, according to at least one embodiment. The stepwise assembly of a unit is based on orienting tetrahedron subunits according to orthogonal and parallel axes. Tetrahedron shown in FIG. 10 is fully constrained by its neighbors. Since there is no binder material between unit cells, forces and energy are substantially transmitted through the contact surfaces.

Figure 11B:
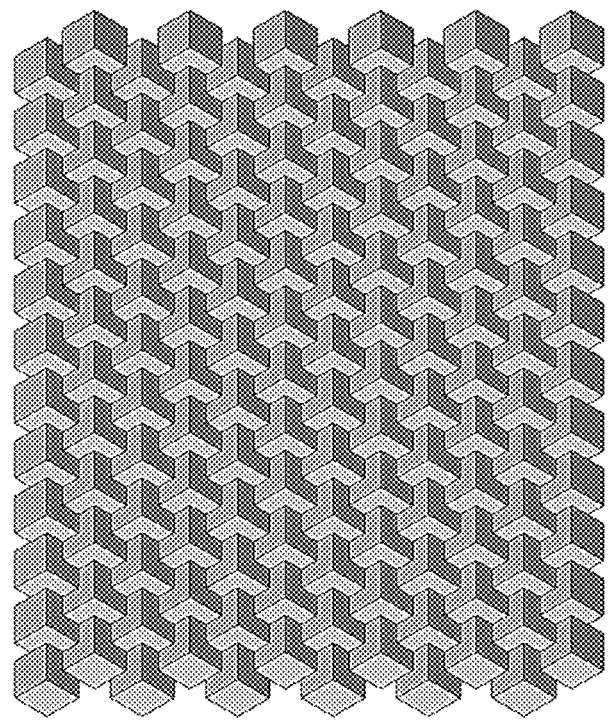
FIGS. 11(A) and 11(B) are two TIBA assemblies utilizing tetrahedral structures and cube structures, respectively.
Figure 11A:
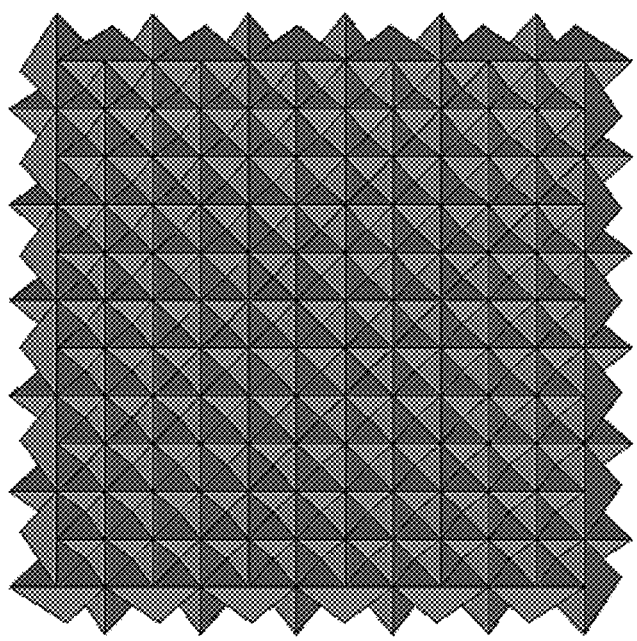

Referring to FIGS. 11(A) and 11(B), two TIBA assemblies are shown utilizing tetrahedral structures (FIG. 11(A)) as well as cube structures (FIG. 11(B)). It should be noted that other Platonic solids (octahedron, dodecahedron and icosahedron) can also be used as basic units.

Referring to FIGS. 12(A) and 12(B), two types of impact on TIMs 124 are depicted. In the first type (FIG. 12(A)), a transverse loading using a load application device 121 is depicted, as described below. In the second type (FIG. 12(B)) an in-plane loading using a load application device 122 is depicted. Load applying devices are well known to those of ordinary skill in the art. Due to the interlocking of unit cells, TIBA can carry both transverse and in-plane loading. In FIGS. 12(A) and 12(B), 123 represents the enclosing structure (abutments) for the TIMs being investigated.

Figure 13:
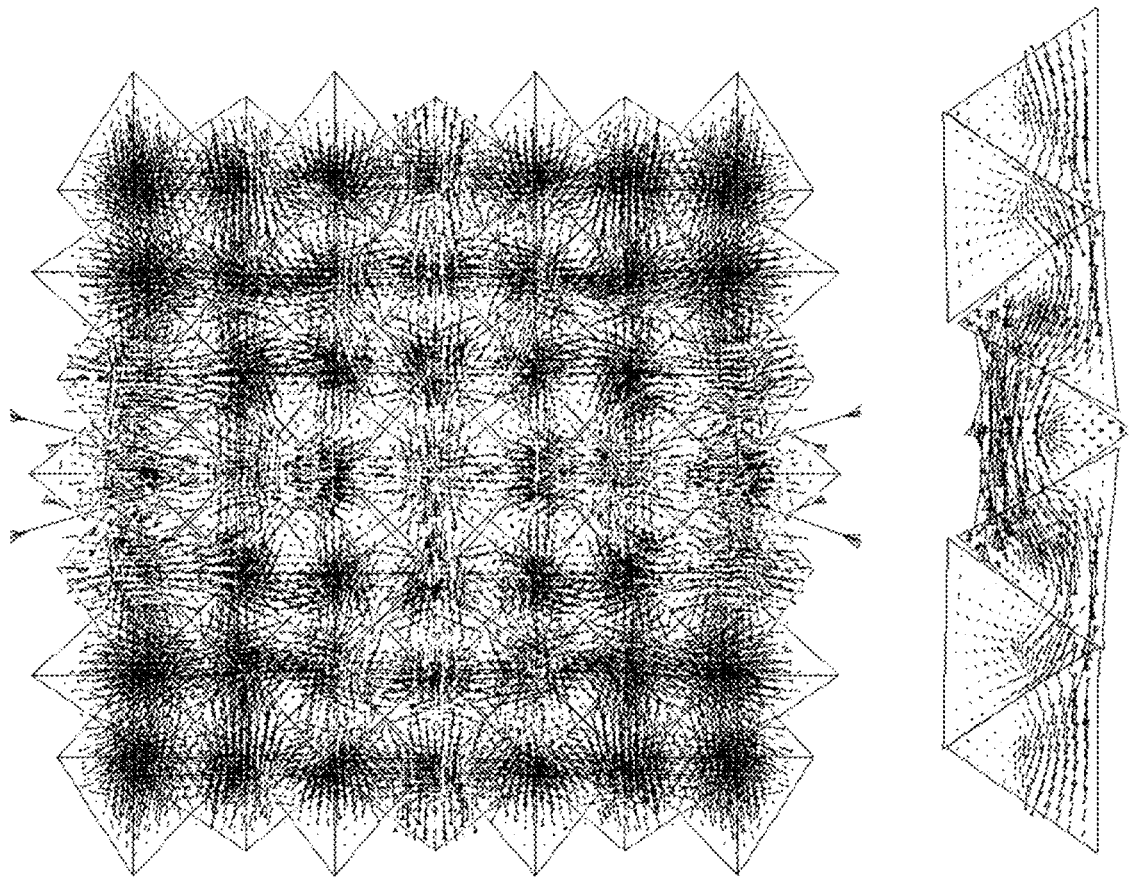
FIGS. 13(A) and 13(B) are deflection patterns (top view and cross sectional views, respectively) as a result of a transverse loading.

Referring to FIGS. 13(A) and 13(B), deflection patterns (top view and cross sectional views, respectively), are depicted as a result of a transverse loading (with reference to FIG. 12(A)). FIG. 13(B) demonstrates that in-plane stresses develop during the impact.

Referring to FIGS. 14(A) and 14(B), deflection patterns (top view and cross sectional views, respective), are depicted as a result of an in-plane loading (with reference to FIG. 12(B)). FIGS. 14(A)-(B) demonstrate that out-of-plane stresses develop during the impact due to the oblique angle of contact surfaces.

Figure 15:
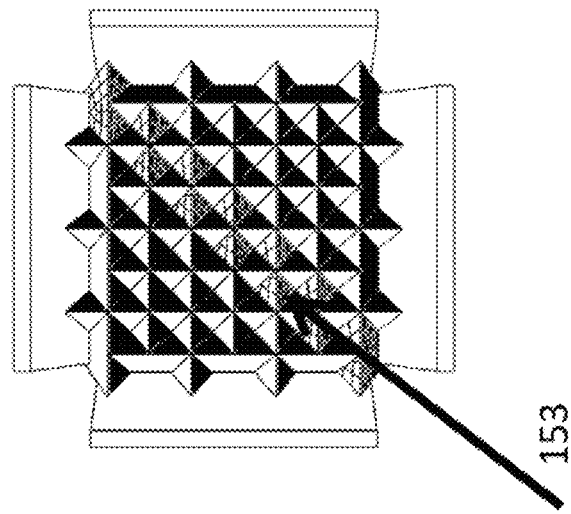
FIGS. 15(A), 15(B) and 15(C) are depictions of sacrificial elements in TIMs structures according to this disclosure.

According to one embodiment, the TIMs structure can include sacrificial elements, Exemplary configuration are depicted in FIGS. 15(A) (single cells located at center of TIMs assembly, with example 151), 15(B) (cells in a row or column, with example 152), and 15(C) (cells disposed diagonally, with example 153). It should be noted that random locations are also possible in selected cases. In FIGS. 15(A)-15(C), 155 represents the fixture or abutments for the TIMs being investigated. While the ordinary elements are intended to deform and have surface movement with respect to each other, thereby converting kinetic energy of a transverse or in-plane impact to a heat and deformation, and then return to their pre-impact position and shape (i.e., elastic deformation) the sacrificial elements are configured to deform differently. In one embodiment, the sacrificial elements are configured to initially deform elastically and then deform plastically (permanently), hence the name sacrificial. The sacrificial elements can be made of rigid-crushable foam. The mechanical criterion for the material for the sacrificial element is that the material has a lower mechanical strength than the other tetrahedral elements of the TIMs structure and the battery cells. Further requirements include being inert and capable of substantial energy absorption. A non-limiting example of a material for the sacrificial element is rigid polyvinylchloride (PVC) foam. The properties of the sacrificial element can be optimized for each configuration. In another embodiment, the sacrificial elements may include a fluid that when the element has sufficiently deformed, the deformation causes rupture of the element, allowing the fluid to be expelled. The fluid can be in the form of a coolant, or a fire extinguishing fluid. The expelled fluid can be used to put out fire or cool battery cells (not shown). Examples of suitable fluids for this are fire-extinguishing fluids which include fluids containing sodium chloride (NaCl) dry powder or fluids containing copper (Cu) dry powder. Both these powders are used in Class "D" fire extinguishers.

Figure 15B:
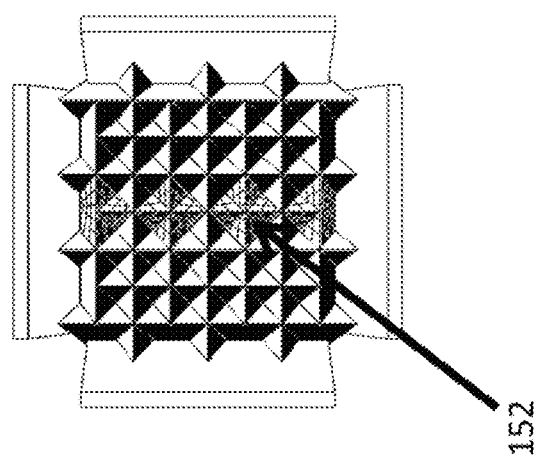
Figure 15:
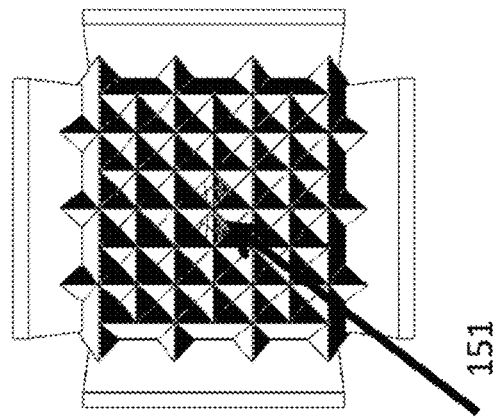
Figure 16C:
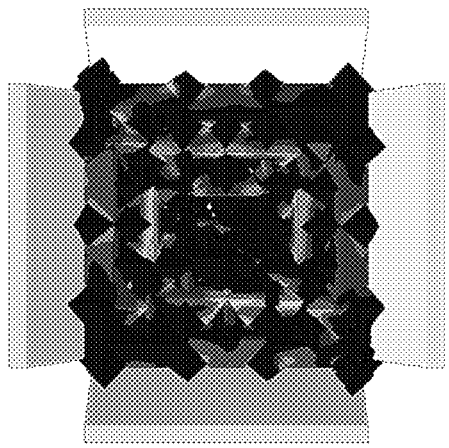
FIGS. 16(A), 16(B), and 16(C) are depictions of deformation of TIBA of FIGS. 15(A), 15(B), and 15(C) respectively due to a transversely applied impact force.
Figure 16B:
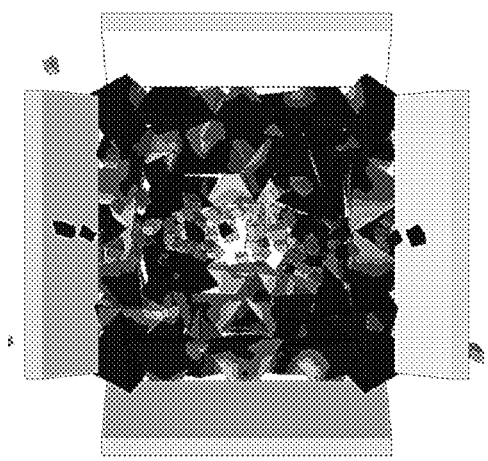
Figure 16A:
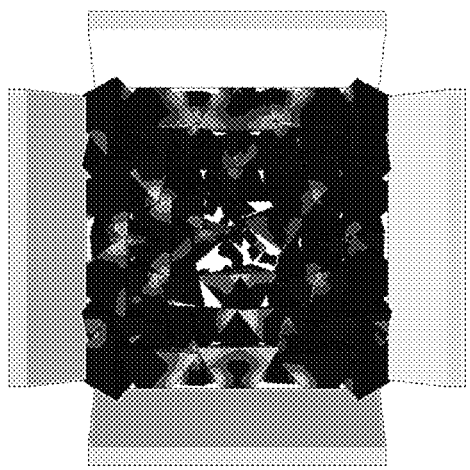

Referring to FIGS. 16(A), 16(B), and 16(C), the TIBA of FIGs. FIGS. 15(A), 15(B), and 15(C) are depicted in a deformed manner with a transversally applied impact force, respectively. In FIGS. 16(A)-16(C), 161 represents the fixture or abutments for the TIMs being investigated.

Figure 17:
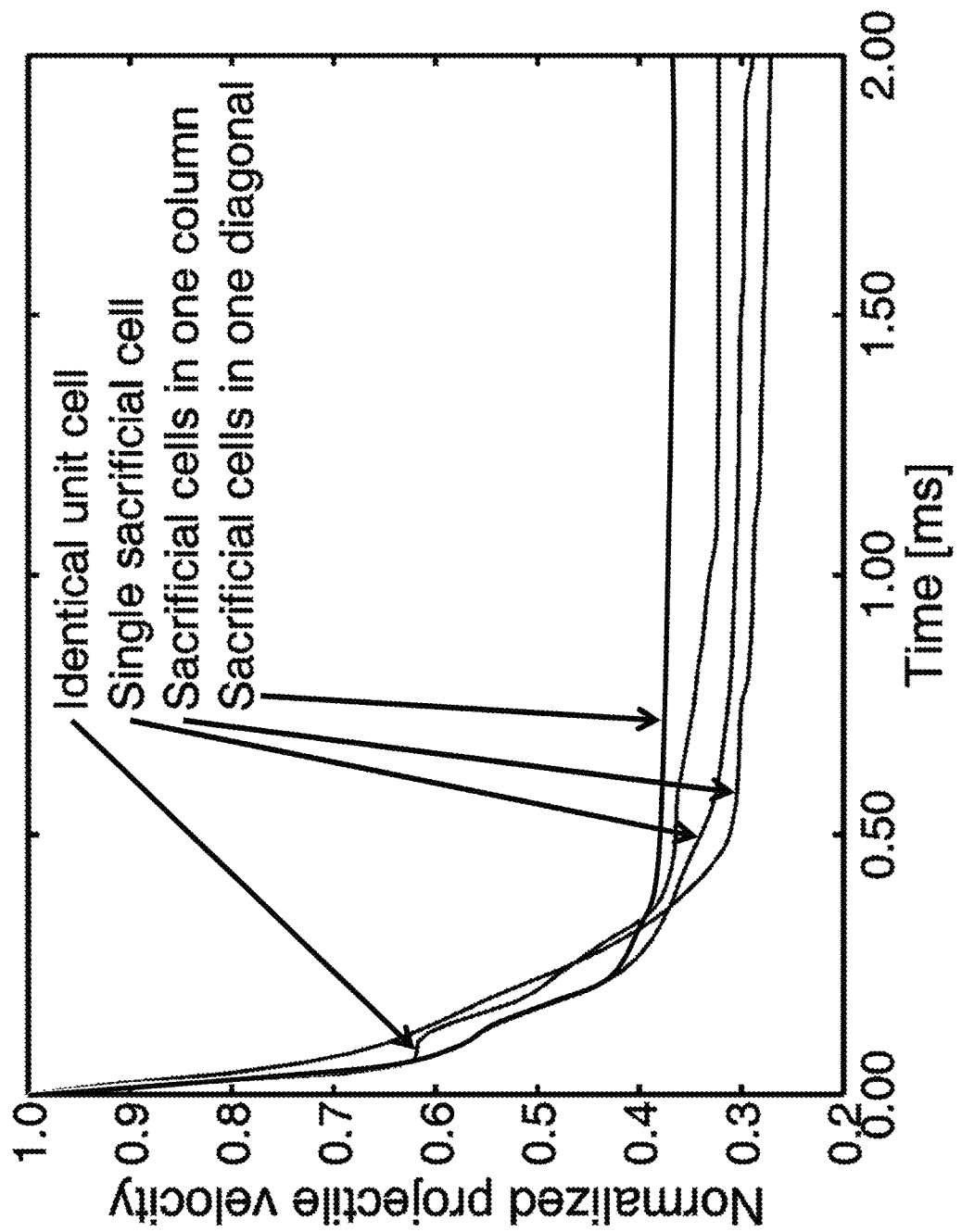
FIG. 17 is a plot of normalized velocities of projectiles transversely impacting TIBAs vs. time with different configurations of the TIMs cells.
Figure 18:
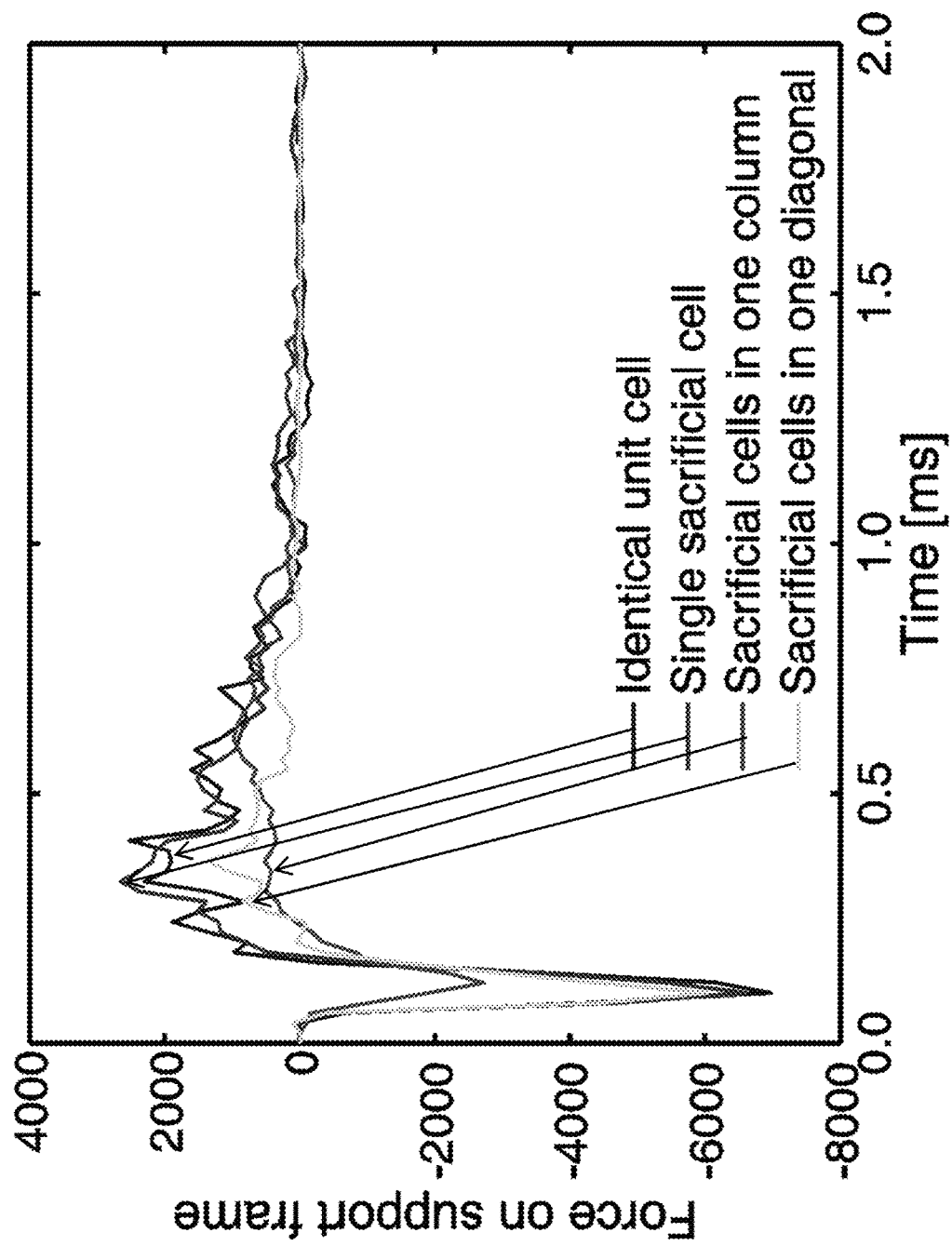
FIG. 18 is a plot of reaction forces (impact direction) on frame vs. time in different model configurations.
Figure 19:
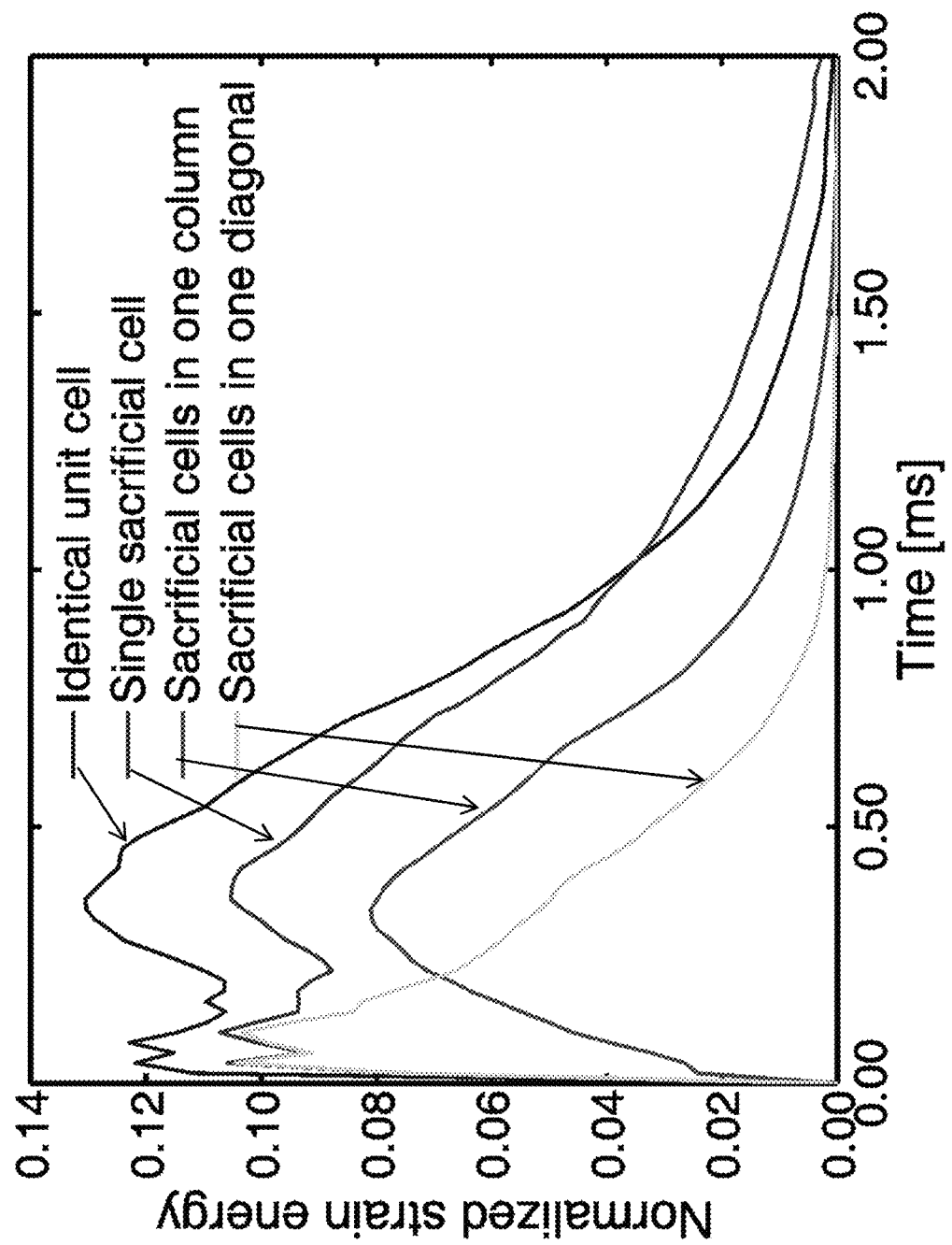
FIG. 19 is a plot of normalized strain energy of TIBAs subject to transverse impact vs. time.
Figure 20:
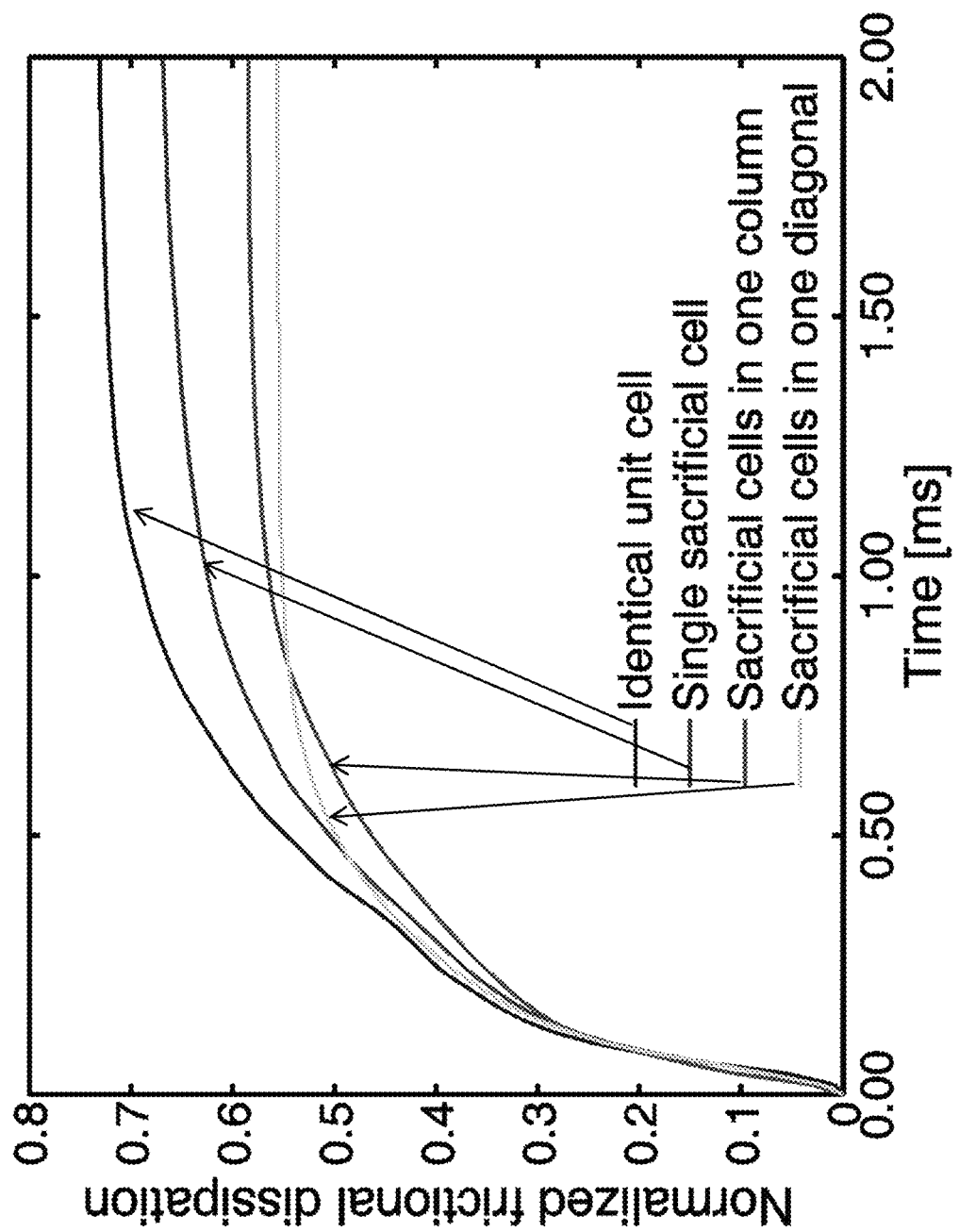
FIG. 20 is a plot of normalized frictional dissipation energy of TIBAs subject to transverse impact vs. time.

Referring to FIG. 17, normalized velocities of projectiles transversely impacting TIBAs with different configurations are depicted. The velocities are normalized with the impact velocity. The results indicate that with optimized arrangement of sacrificial units, the resistance of TIBA can be optimized. FIG. 18 shows reaction forces (impact direction) on frame with different model configurations. The sacrificial units can significantly reduce the force transferred. FIG. 19 depicts strain energy of TIBAs subject to transverse impact. FIG. 20 depicts frictional dissipation energy of TIBAs subject to transverse impact.

Figure 21:
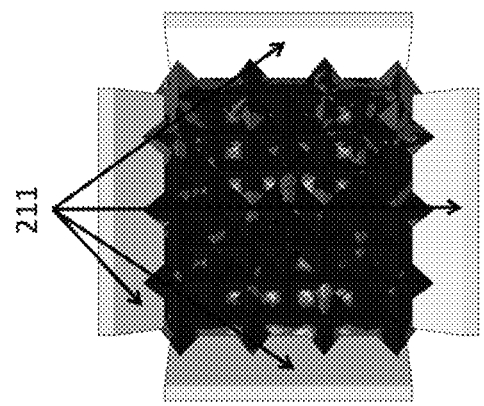
FIGS. 21(a), 21(b), and 21(c) are depictions of deformation of the TIBA of FIGS. 15(A), 15(B), and 15(C) respectively with an in-plane applied impact force.
Figure 21B:
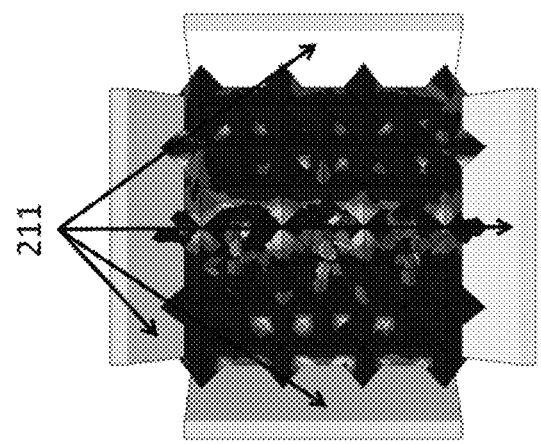
Figure 21:
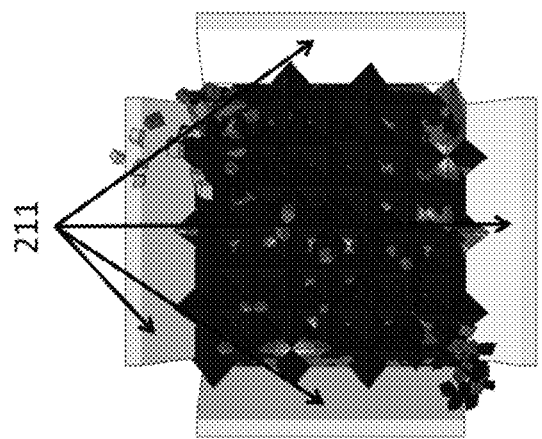

Referring to FIGS. 21(a), 21(b), and 21(c), the TIBA of FIGS. 15(A), 15(B), and 15(C) are depicted in a deformed manner with an in-plane applied impact force, respectively. In FIG. 21, the enclosure for TIMs is represented as 211. In FIGS. 21(a)-21(c), 211 represents the fixture or abutments for the TIMs being investigated.

Figure 22:
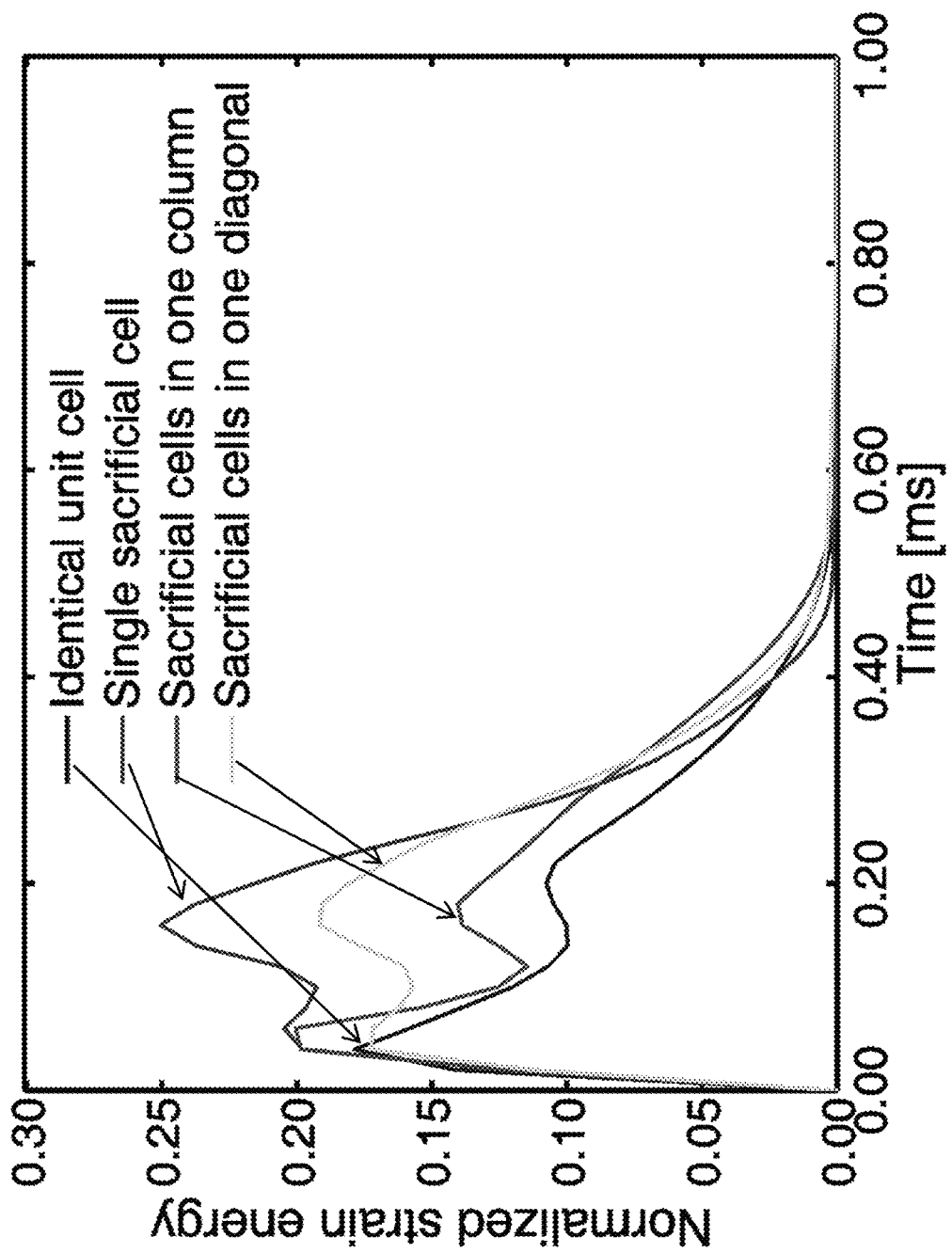
FIG. 22 is a plot of normalized strain energy TIBAs subject to in-plane impact vs. time.
Figure 23:
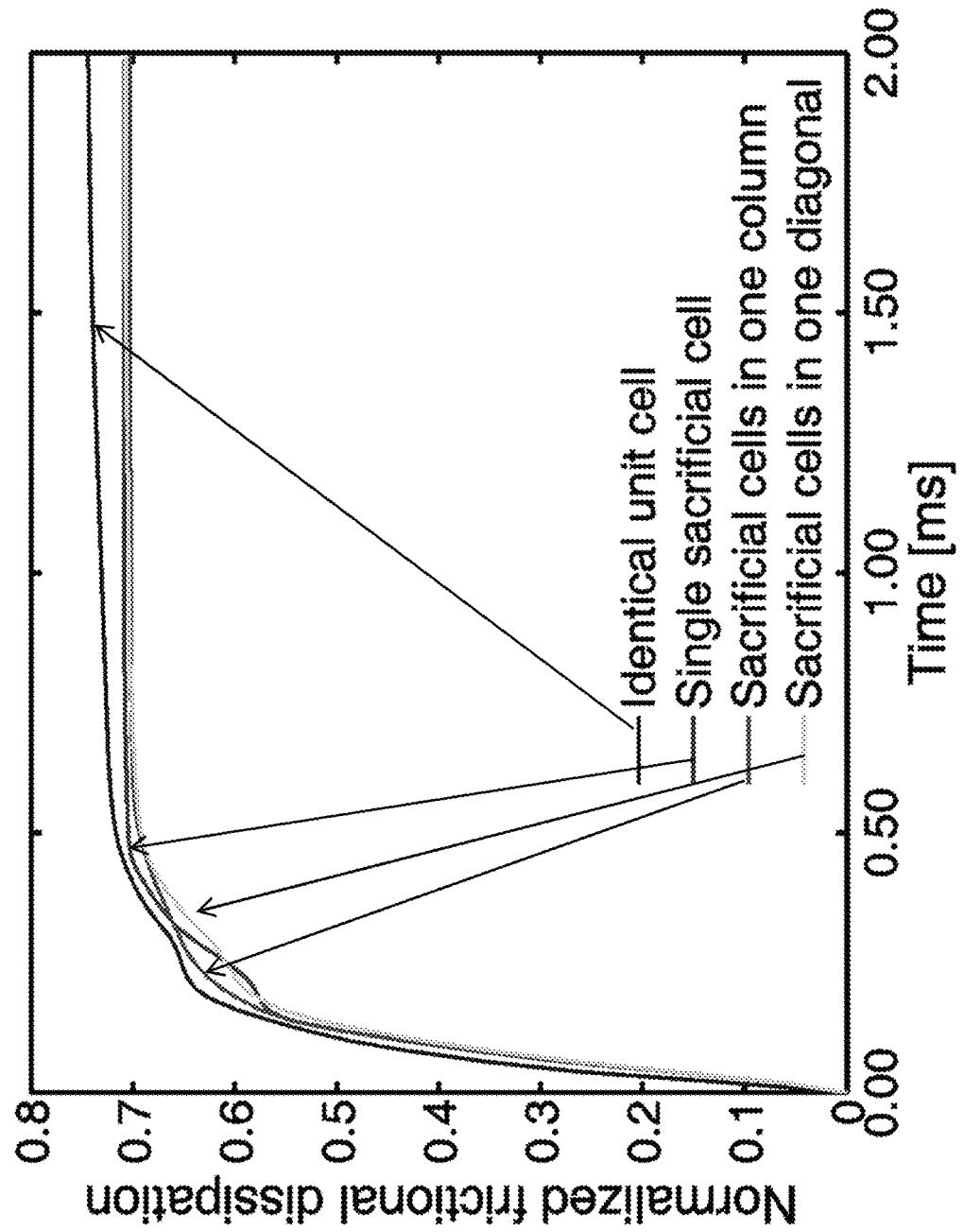
FIG. 23 is a plot of frictional dissipation energy of TIBAs subject to in-plane impact vs., time.

Referring to FIG. 22, strain energy of TIBAs subject to in-plane impact are depicted. Referring to FIG. 23 frictional dissipation energy of TIBAs subject to in-plane impact is depicted.

Figure 24:
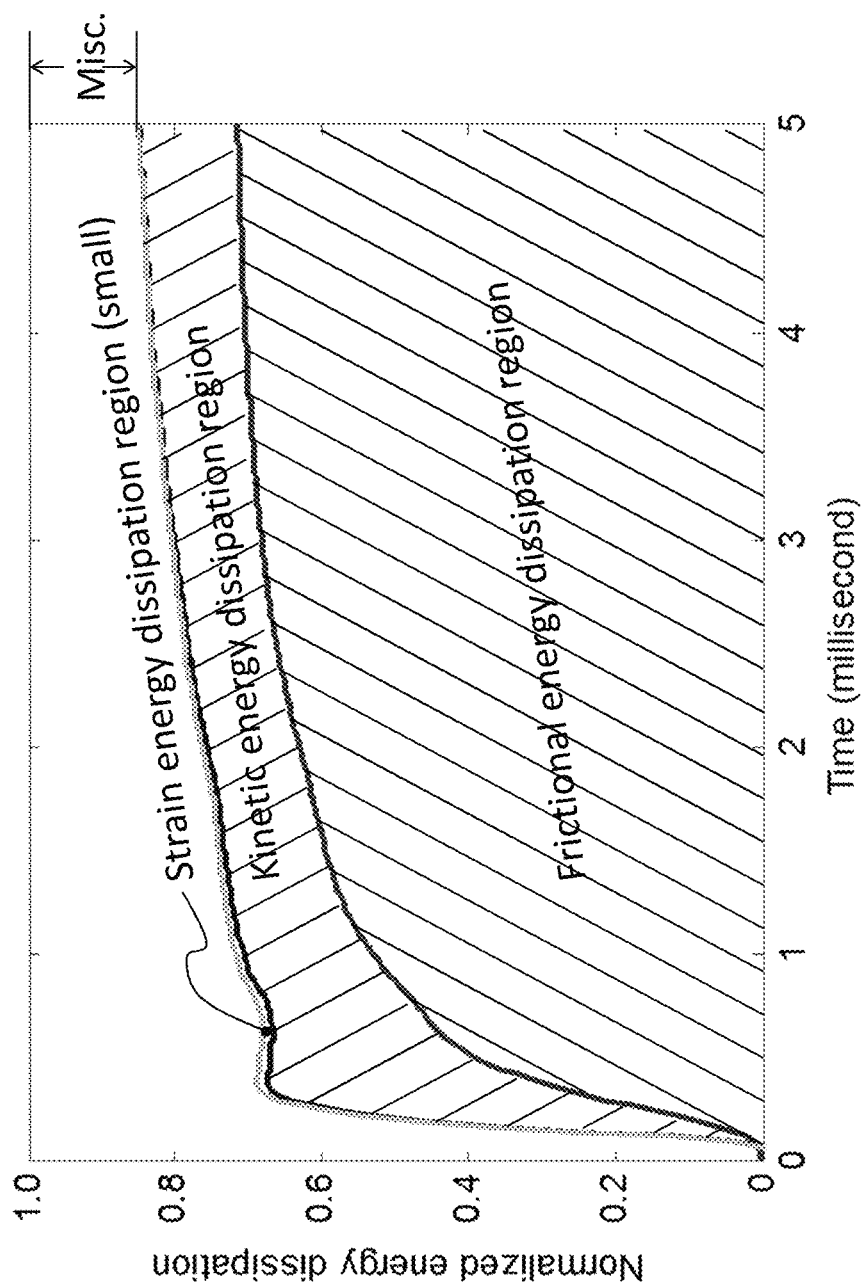
FIG. 24 is a plot of normalized energy dissipation of TIBA subject to transverse impact loading vs. time.

Referring to FIG. 24, the energy dissipation of TIBA subject to transverse impact loading is depicted. It can be seen that frictional dissipation dominates the energy dissipation. While the frictional dissipation is a function of impact loading, material properties and contact parameters. Among them, contact parameters play significant role in the friction energy, which is desirable to achieve higher energy absorption. The parameters can be optimized with modifying the cell surfaces.

Sacrificial cells in TIBA act like safety fuses: when the impact loading is severe, they break to prevent extremely high stress developing in TIBA. Different arrangements of sacrificial elements can be employed to optimize the performance of TIBA in absorbing impact energy.

Figure 25:
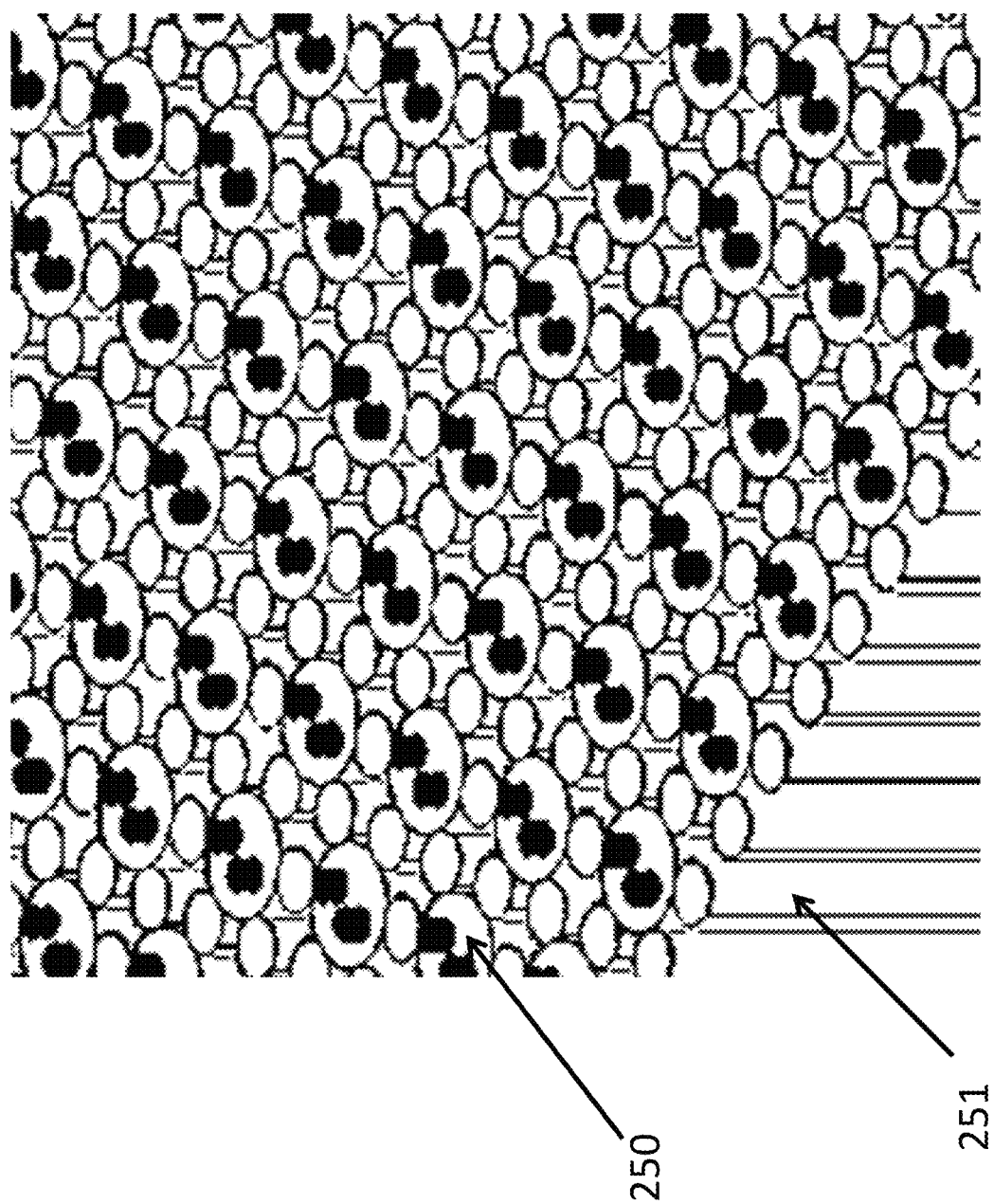
FIG. 25 is an illustration of one embodiment of this disclosure showing a plurality of battery cells, each cell surrounded by TIMs units made according to the present disclosure.

FIG. 25 is an illustration of one embodiment of this disclosure where in a plurality of battery cells (an exemplary cell 250 is shown), each cell surrounded by deformation units (an exemplary unit 251 is shown.) made according to the present disclosure. These deformation units can be made from aluminum or stainless steel as previously described. It may be possible to make the deformation units 251 as a topologically interlocked material, though the processes for making different geometries with TIMs can be complex and the size of TIMs units have to be carefully selected. A non-limiting example of a material from which TIMs structures can be made is VeroWhitePlus available from Stratasys Ltd, Eden Prairie, Minn., USA. Acrylonitrile butadiene styrene (ABS) and Acrylic are examples of a material that can be used to make TIMs. TIMs can be made using additive manufacturing techniques as mentioned earlier.

TIM structures can then be assembled using techniques such as self-assembly, robotic assembly, and other special mechanisms.

Figure 26:
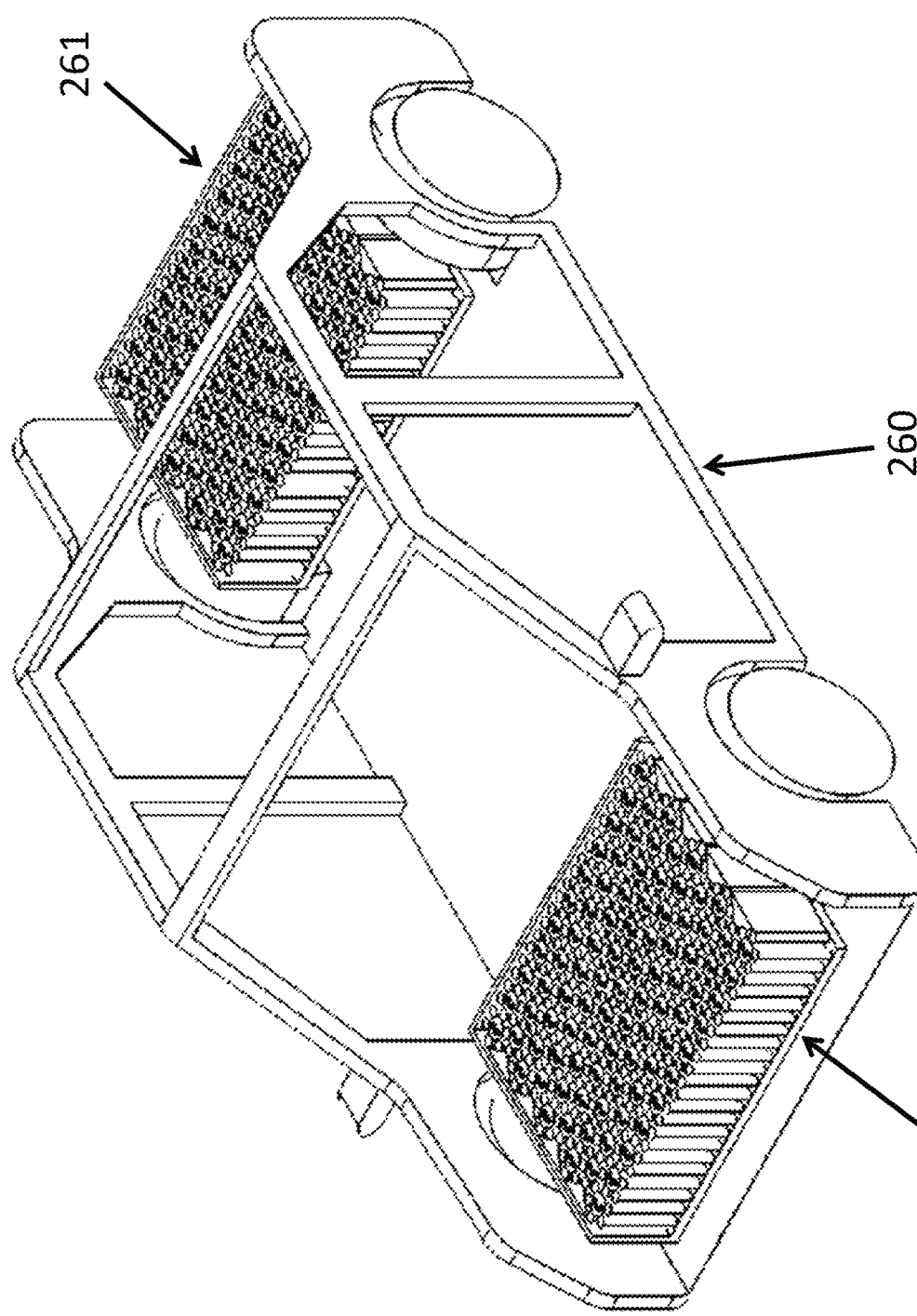
FIG. 26 is a schematic of a vehicle with two battery packs equipped with one embodiment of the TIBA enclosure arrangement of the present disclosure.

Referring to FIG. 26, a schematic of a vehicle 260 with two TIBA battery enclosure systems is depicted, according to one embodiment of such enclosure arrangement. Each enclosure system in FIG. 26 contains one TIBA battery enclosure module. However, a TIBA battery enclosure system can contain a plurality of battery enclosure modules. While two TIBA enclosure systems are depicted, it is understood that the number of TIBA enclosure systems can be one or more than two. Similarly, various locations of the vehicle can be used for the TIBA battery enclosure systems. The TIBA enclosure systems can be configured in various shapes (although rectangular systems are depicted in FIG. 26).

Figure 27:
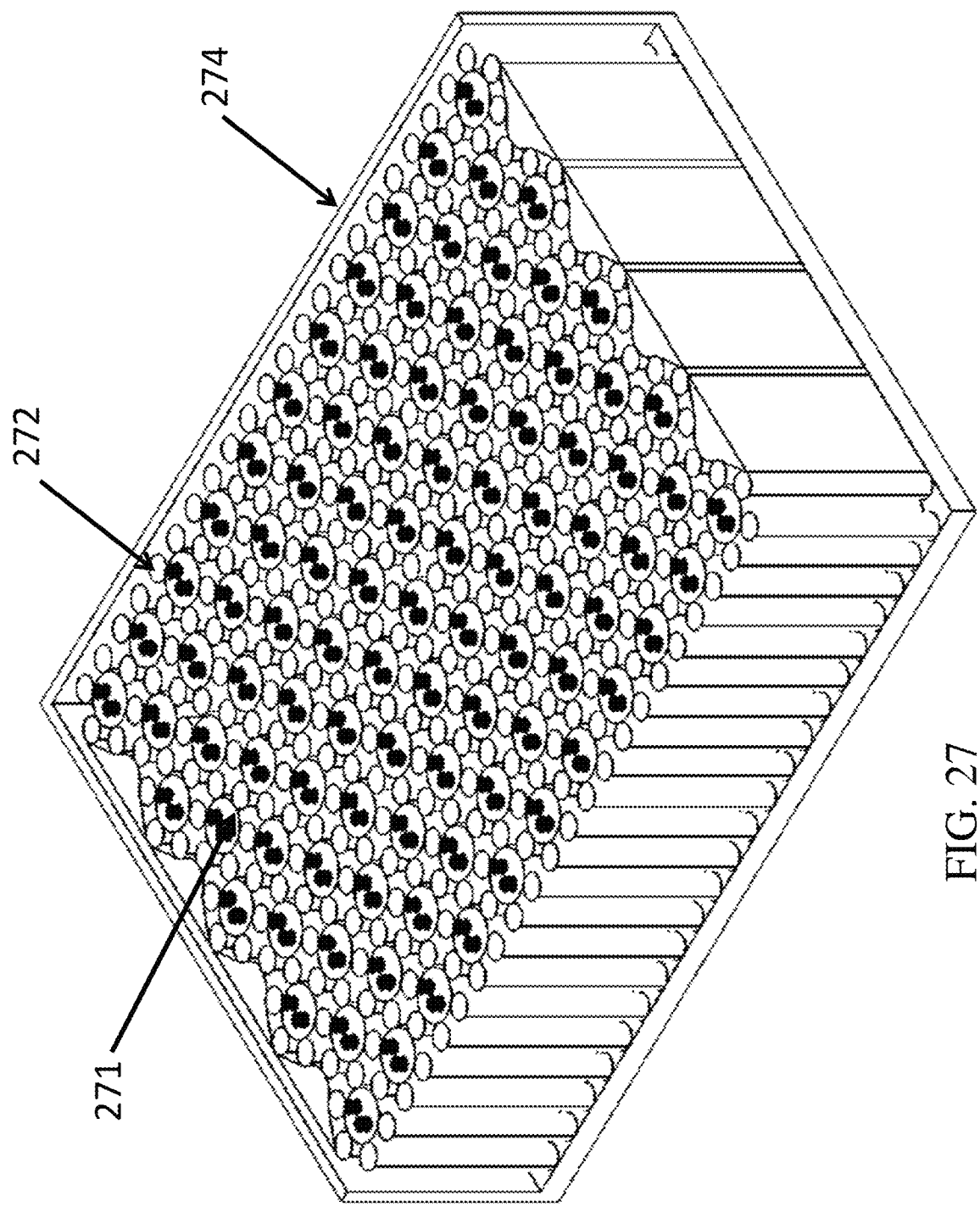
FIG. 27 is an illustration of a frame (enclosing a battery pack including battery cells and deformation units) made from TIMs.

Referring to FIGS. 26-27, a frame 274 made of TIMs, a plurality of battery cells 271, and deformation units 272 made as described above with reference to deformation units

251, are depicted. The battery cells are depicted as larger cylindrical objects 271 with terminals disposed on the surface of each cell as well as deformation units 272 inter-disposed (depicted as smaller diameter objects) between and around the cells. Each cell is surrounded by six deformation units; however, larger or smaller numbers of deformation units are also possible. For example, the number of deformation units can be as low as one unit between two adjacent cells. It should be appreciated that the deformation units can be formed into a number of geometrical shapes, and no limitations should be associated with the cylindrical shape depicted. While there may be practical limits on the number of deformation units between the cells, the limit can be larger than six. Furthermore, while a uniform pattern of cells/deformation units is depicted in FIGS. 26-27, no such limitation exists. It should be appreciated that the pattern of cells/deformation units can be variable. For example, there may be a larger number of deformation units inter-disposed between the cells closer to the perimeter and lower number of deformation unit towards the center of the pack.

The deformation units are configured to move with respect to one another and with respect to the battery cells such that when an object impacts the pack and delivers an impact force, the kinetic energy is converted to frictional energy as the deformation units slide and experience relative shear motion with respect to one another and with respect to the cells as well as strain energy as the deformation units deform.

Also shown in FIGS. 26 and 27, are frames encasing the cells and the deformation units. FIG. 27 is an illustration of a TIBA battery enclosure system with the frame 274 made from TIMs. These frames are configured to hold the structures comprising battery cells and deformation units in place and to provide a containing envelope during and after impact. The frames and the deformation units in one embodiment can be called a TIBA-based enclosure or just TIBA. The term TIBA can also be used to represent an assembly of frame and batteries and deformation units or combinations thereof such as frame and batteries, batteries and deformation units, or just deformation units.

Figure 28:
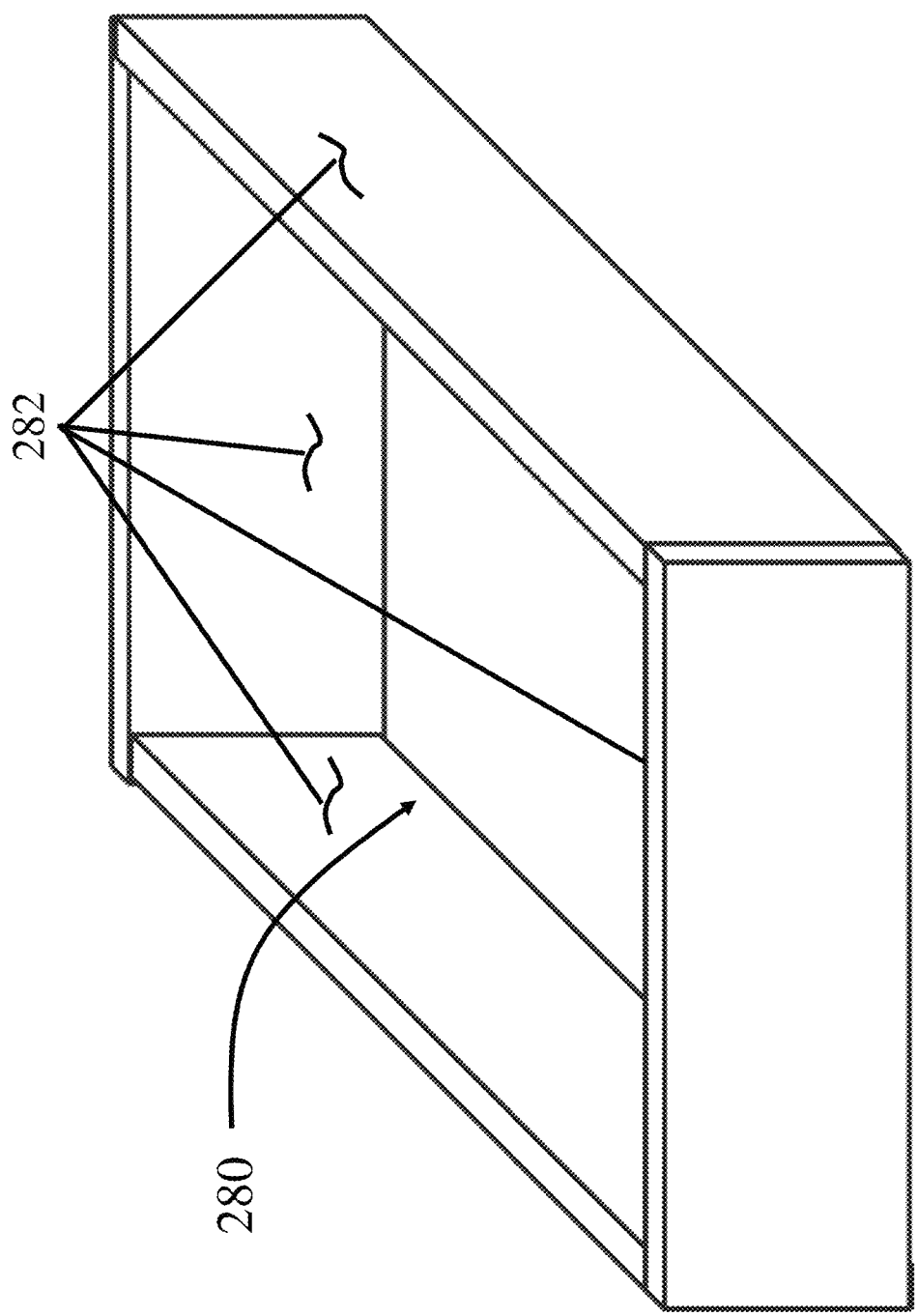
FIG. 28 is a schematic representation of an enclosure arrangement according to the present disclosure.

With reference to FIG. 28, an embodiment of an enclosure arrangement utilizing TIBA according to the present disclosure is depicted. In this embodiment, the perimeter formed by four of the vertical walls 282 made of TIMs defines a spatial zone 280. The spatial zone 280 can house multiple TIBA enclosure arrangement modules (that is, a TIBA-based battery enclosure arrangement system). Alternatively, the spatial zone 280 may comprise a combination of battery cells and deformation units. The advantage of such an arrangement is that damaged enclosure modules or damaged cell/deformation combinations can be serviced or replaced.

While the present disclosure has been described with reference to certain embodiments, it will be apparent to those of ordinary skill in the art that other embodiments and implementations are possible that are within the scope of the present disclosure without departing from the spirit and scope of the present disclosure. For example, GBA and TIBA can be combined to provide impact resistance to a battery pack. That is, battery cells can be surrounded by deformation units as described with reference to GBA and enclosed in a frame made of TIMs. One can deploy several enclosure modules or systems in a vehicle, some utilizing GBA technology and some utilizing TIBA technology. Further, GBA and TIBA can be chosen depending on the application. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A topologically interlocked battery enclosure system for a vehicular battery system comprising:
   at least one topologically interlocked battery enclosure module, the at least one topologically interlocked battery enclosure module comprising:
      a plurality of battery cells;
      a plurality of kinetic energy absorbing elements, each kinetic energy absorbing element being in contact with at least one of the battery cells; and
      a frame made of topologically interlocked material configured to encase the plurality of the kinetic energy absorbing elements and the battery cells
   wherein the topologically interlocked materials transmit forces and energy through contact surfaces and wherein no tensile forces are developed when the topologically interlocked materials carry loads.

2. The topologically interlocked battery enclosure system of claim 1, the kinetic energy absorbing elements are made of aluminum.

3. The topologically interlocked battery enclosure system of claim 1, the kinetic energy absorbing elements are made of stainless steel.

4. The topologically interlocked battery enclosure system of claim 1, the kinetic energy absorbing elements are made topologically interlocked materials.

5. The enclosure of claim 1, the topologically interlocking material is acrylonitrile butadiene styrene or acrylic.

6. The topologically interlocked battery enclosure system of claim 4, the topologically interlocking material is acrylonitrile butadiene styrene or acrylic.

7. The topologically interlocked battery enclosure system of claim 1, further comprising at least one sacrificial element disposed in the topologically interlocked material.

8. The topologically interlocked battery enclosure system of claim 7, the at least one sacrificial element is rigid crushable foam.

* * * * *